(12) United States Patent
Miller

(10) Patent No.: US 7,561,997 B1
(45) Date of Patent: Jul. 14, 2009

(54) SIMULATION SYSTEM INCLUDING A SIMULATOR AND A CASE MANAGER ADAPTED FOR ORGANIZING DATA FILES FOR THE SIMULATOR IN A NON-CONVENTIONAL TREE LIKE STRUCTURE

(75) Inventor: Thomas R. Miller, Nr. Wallingford (GB)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/270,128

(22) Filed: Mar. 16, 1999

(30) Foreign Application Priority Data

Apr. 3, 1998 (GB) .................................. 9807102.0
Aug. 12, 1998 (GB) .................................. 9817501.1

(51) Int. Cl.
*G06F 9/455* (2006.01)
(52) U.S. Cl. .............................. 703/10; 702/6; 367/81; 367/86
(58) Field of Classification Search ...................... 705/8, 705/10, 7; 379/15.01; 370/244, 249; 345/419, 345/664, 853, 854; 386/46–68, 83; 702/6; 367/69, 72, 81, 86; 703/10, 17, 22, 6; 707/1, 707/2, 100–104, 104.1; 716/5; 717/120; 706/6

See application file for complete search history.

(56) References Cited

U.S. PATENT DOCUMENTS

| | | | |
|---|---|---|---|
| 5,566,295 A | 10/1996 | Cypher et al. | |
| 5,657,223 A | 8/1997 | Juszczak et al. | |
| 5,835,566 A * | 11/1998 | Cowgill | 379/15.01 |
| 6,018,497 A * | 1/2000 | Gunasekara | 367/72 |
| 6,047,293 A * | 4/2000 | Blitz | 707/104.1 |
| 6,078,869 A * | 6/2000 | Gunasekara | 702/6 |

(Continued)

FOREIGN PATENT DOCUMENTS

GB     2 195 193 A     3/1988

(Continued)

OTHER PUBLICATIONS

Rumbaugh et al., "Object oriented modeling and design", Printice-Hall, Inc., 1991.*

(Continued)

*Primary Examiner*—Paul L Rodriguez
*Assistant Examiner*—Kandasamy Thangavelu
(74) *Attorney, Agent, or Firm*—Robert P. Lord; Jim Patterson; Bryan P. Galloway

(57) ABSTRACT

A simulation system includes a case manager adapted for organizing and managing a plurality of sets of input data being used by the simulation system. The case manager includes a plurality of case scenarios organized in a tree-like structure, some case scenarios being supersets of other case scenarios in the tree-like structure. An operator selects one or more of the case scenarios in the case manager. A case builder receives keywords associated with the one or more of the case scenarios selected by the operator allowing the operator to edit or change the keywords from the selected case scenarios when necessary and generates a set of edited keywords representing edited case scenarios. A run manager submits the edited case scenarios to a simulator which generates a set of simulation results that are stored in a results file for subsequent display and viewing.

18 Claims, 28 Drawing Sheets

U.S. PATENT DOCUMENTS

| | | | | |
|---|---|---|---|---|
| 6,151,582 A | * | 11/2000 | Huang et al. | 705/8 |
| 6,275,976 B1 | * | 8/2001 | Scandura | 717/120 |
| 6,389,380 B1 | * | 5/2002 | Bankes | 703/17 |
| 6,487,704 B1 | * | 11/2002 | McNamara et al. | 716/5 |

FOREIGN PATENT DOCUMENTS

| | | |
|---|---|---|
| GB | 2 196 764 A | 5/1988 |
| GB | 2 240 201 A | 7/1991 |
| GB | 2 293 667 A | 4/1996 |
| WO | WO 86/05900 | 10/1986 |
| WO | WO 97/33243 | 9/1997 |

OTHER PUBLICATIONS

Cannon R L et al: "An Expert System as a Component of an Integrated System for Oil Exploration" Energy and Information Technologies in the Southeast, Columbia, Apr. 9-12, 1989, vol. 1, Apr. 9, 1989 pp. 32-35, Institute of Electrical and Electronics Engineers.

Swaby P. A. Rawnsley K D: "An interactive 3D fracture modelling environment" Proceedings of Petroleum Computer Conference, Jun. 2-5, 1996, pp. 177-187, Dallas, TX p. 177, 183.

* cited by examiner

TO FIG.4b

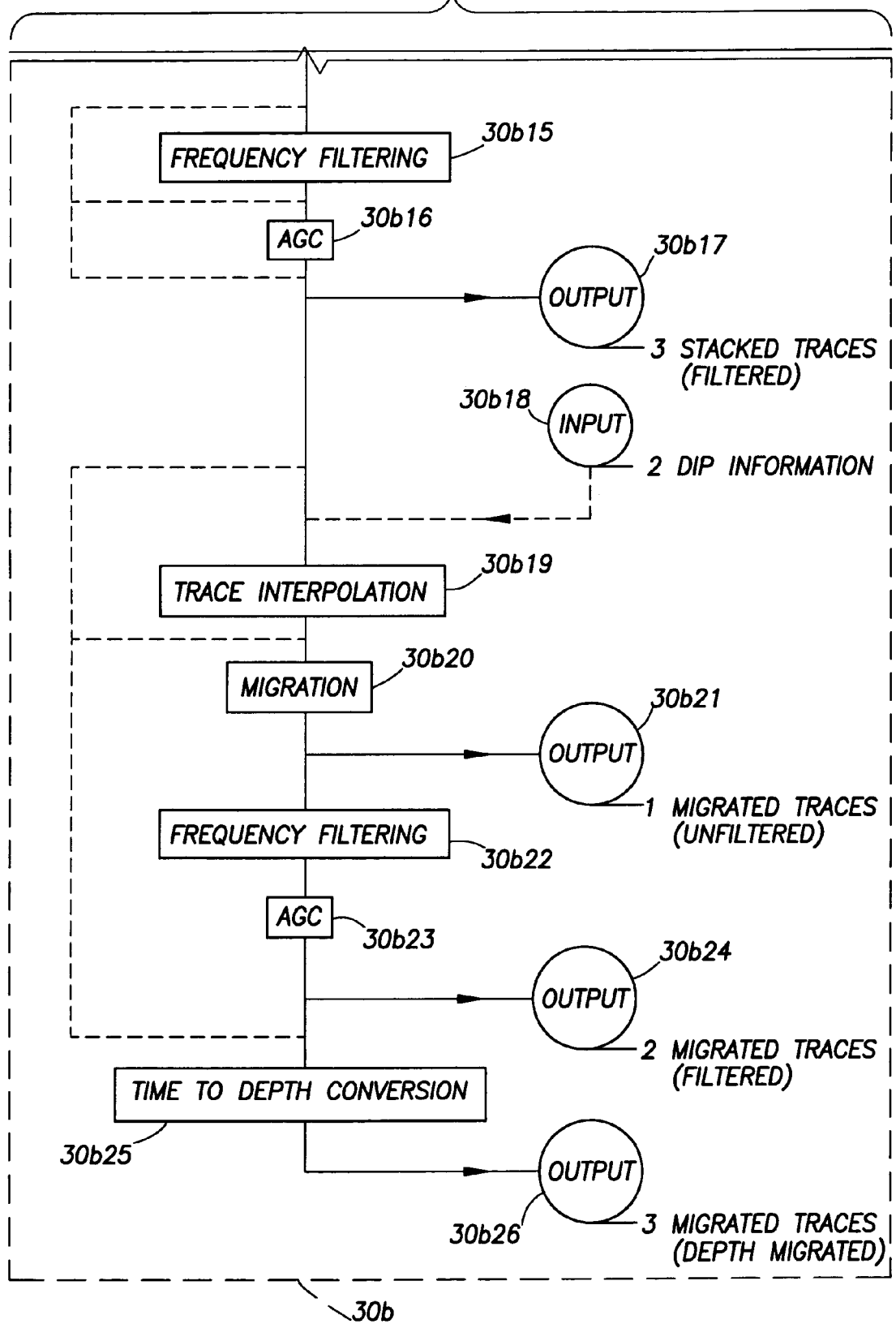

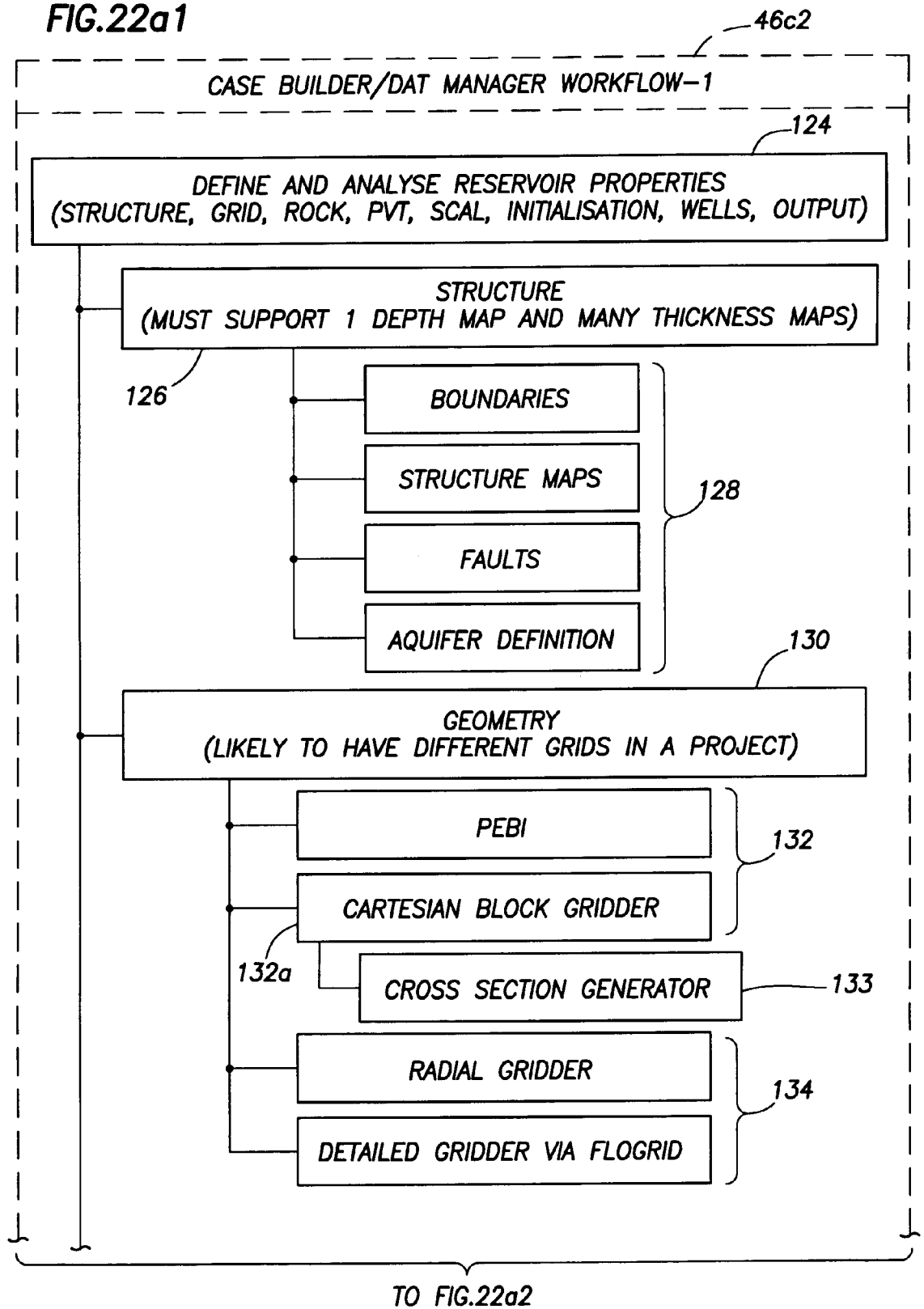
FIG.22a1

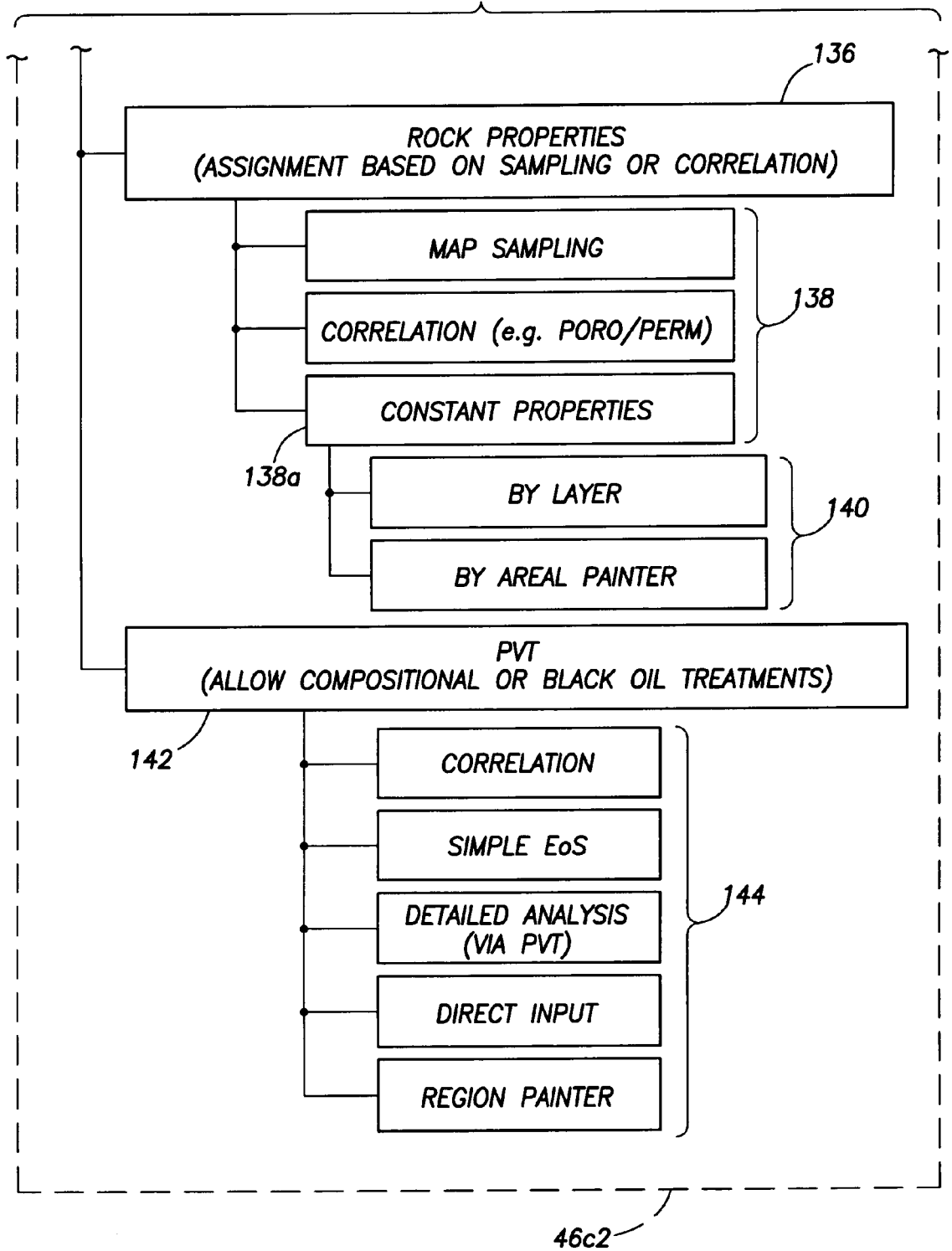

FIG.22b1
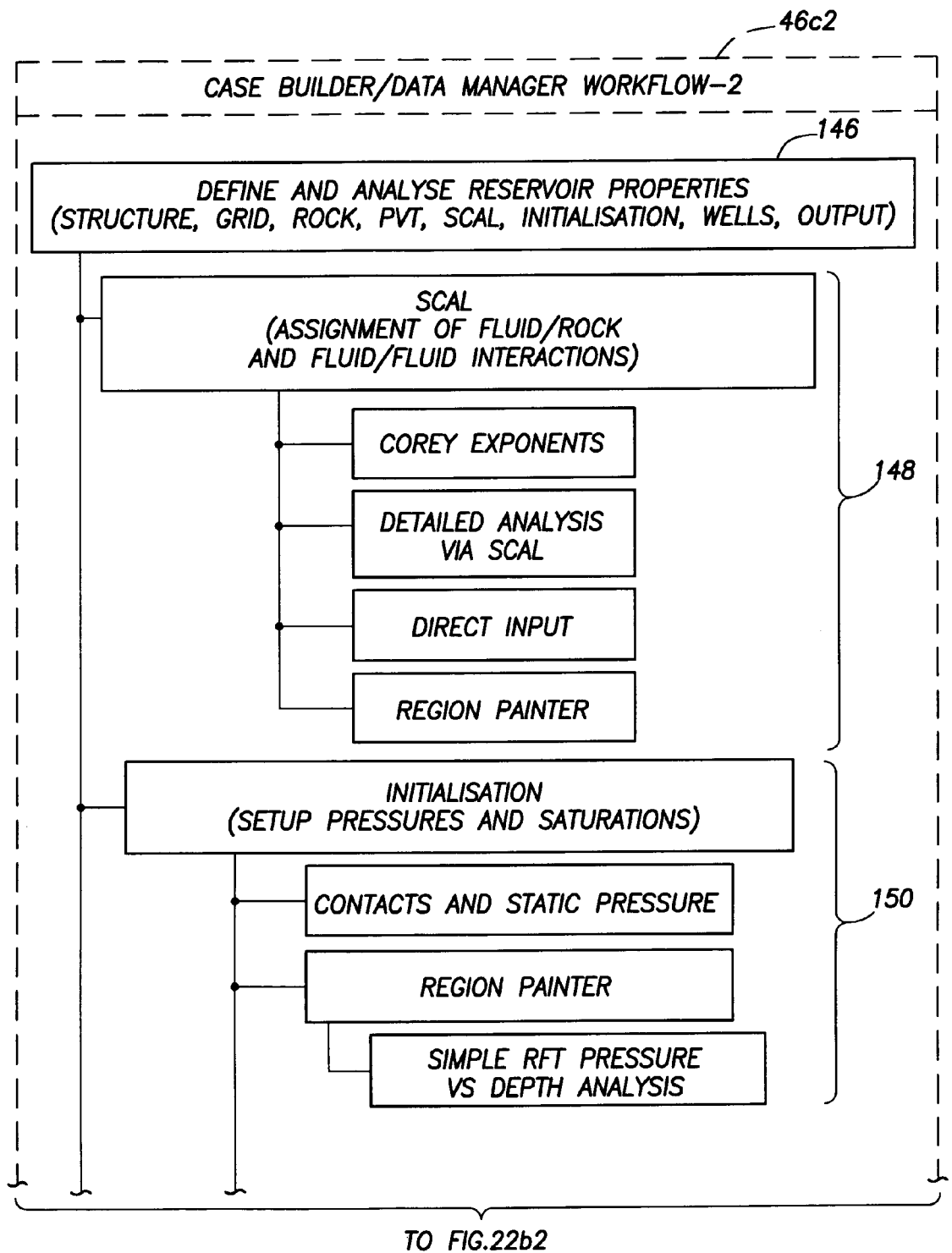

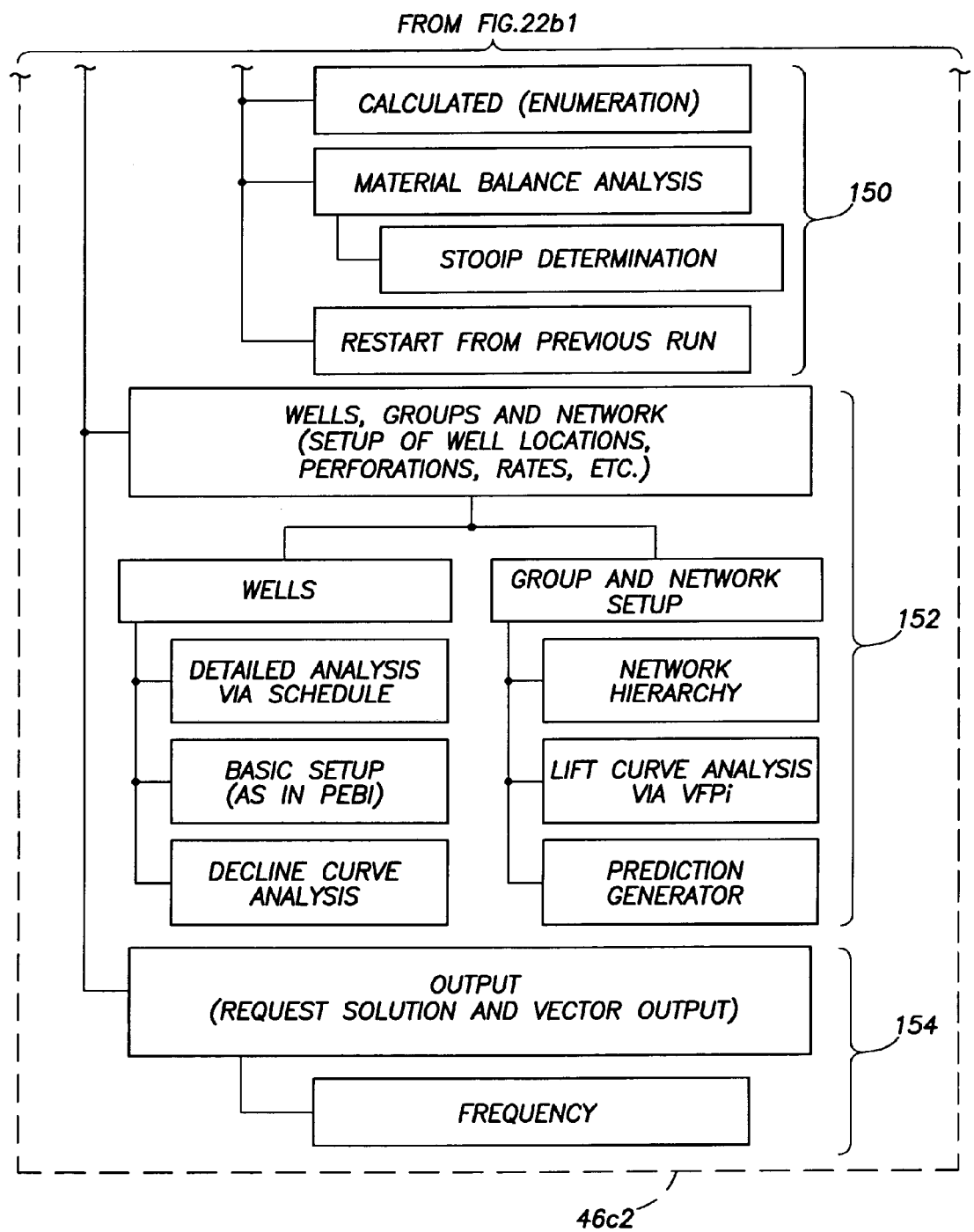

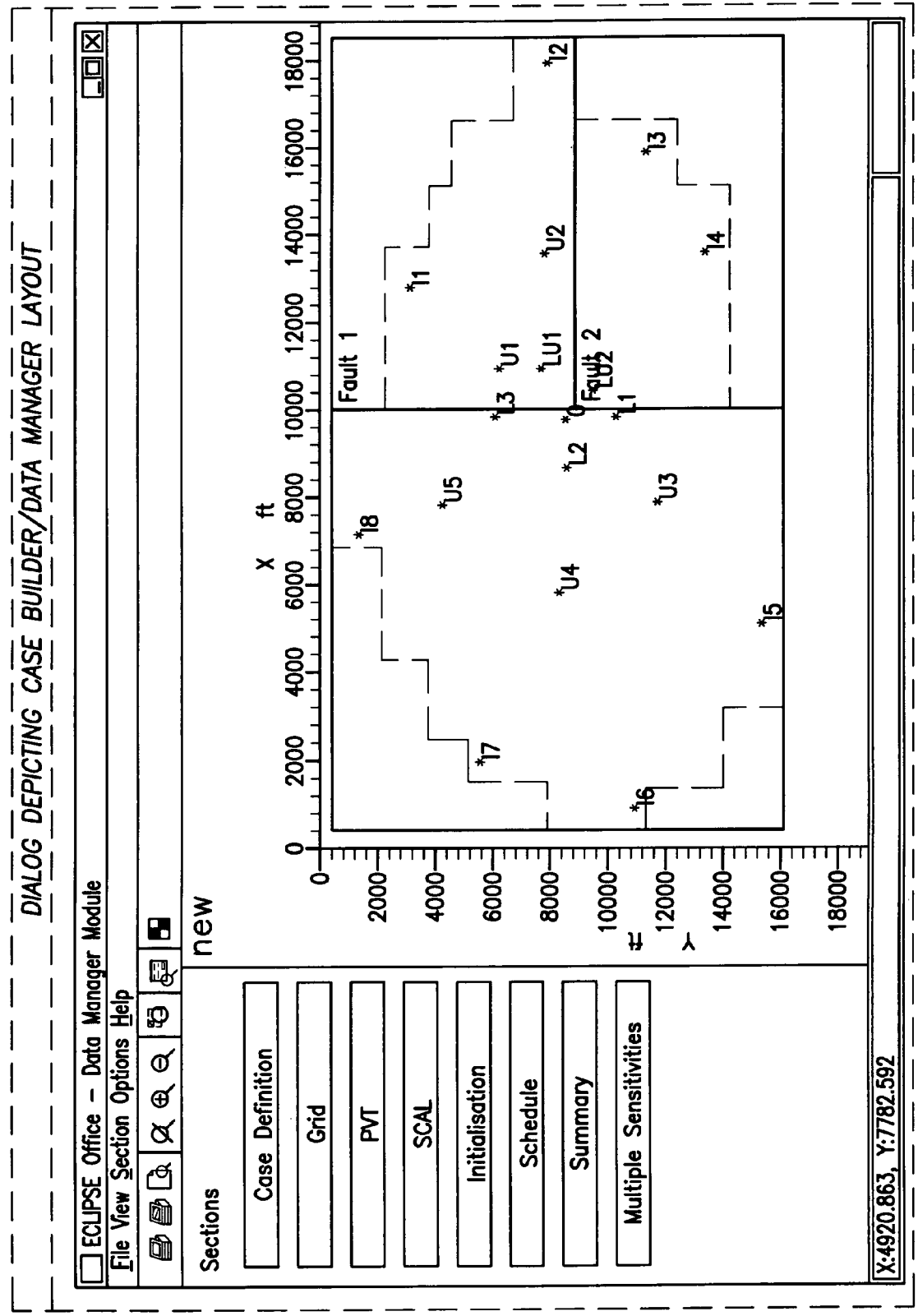
FIG.23 DIALOG DEPICTING CASE BUILDER/DATA MANAGER LAYOUT

FIG. 25  DIALOG DEPICTING PVT LAYOUT

DIALOG DEPICTING SCAL LAYOUT

DIALOG DEPICTING SCHEDULE LAYOUT

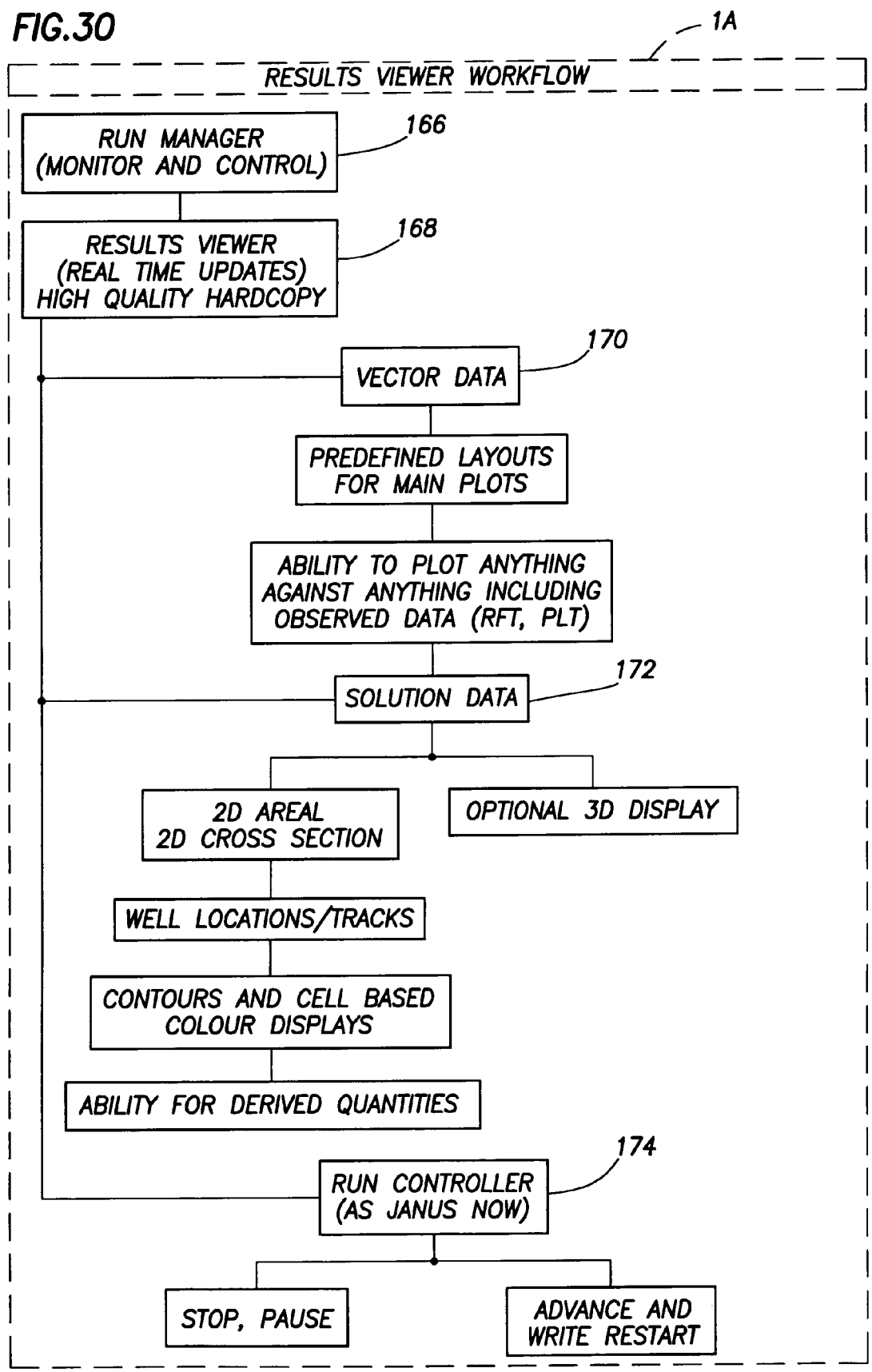

SIMULATION SYSTEM INCLUDING A SIMULATOR AND A CASE MANAGER ADAPTED FOR ORGANIZING DATA FILES FOR THE SIMULATOR IN A NON-CONVENTIONAL TREE LIKE STRUCTURE

BACKGROUND OF THE INVENTION

The subject matter of the present invention relates to a reservoir simulator apparatus and associated method responsive to a set of data for simulating an earth formation located in the vicinity of an oilfield reservoir and for displaying a set of simulation results in response to the simulation, and, more particularly, to a system including a case manager apparatus adapted for organizing and managing a set of test data used by the reservoir simulator, the simulator generating a set of simulation results and displaying the simulation results in response to the data.

Reservoir modeling is performed in order to predict the degree of underground deposits of hydrocarbon bearing formations in an earth formation. Typically, well logging operations are performed in the formation thereby producing well log data, and seismic operations are performed on the formation thereby producing seismic data. The seismic data is reduced thereby producing reduced seismic data. The well log data and the reduced seismic data are introduced, as input data, to a computer workstation which stores a gridding software and a simulator software. A gridding software, hereinafter known as "the Flogrid software" or the "Flogrid gridding software", is disclosed in prior pending U.S. patent application Ser. No. 09/034,701, filed in the U.S. on Mar. 4, 1998, which is based on a Great Britain patent application number 9727288.4 filed Dec. 24, 1997, the disclosure of which is incorporated by reference into this specification. The "Flogrid" gridding software includes another gridding software known as "Petragrid". The "Petragrid" gridding software is disclosed in prior pending U.S. patent application Ser. No. 08/873,234 filed Jun. 11, 1997, the disclosure of which is also incorporated by reference into this specification. The gridding software will respond to the reduced seismic data and the well log data by gridding the earth formation which was subjected to the well log operation and the seismic operation. The type of grids imposed on the earth formation include structured (approximately rectangular) grids and unstructured (tetrahedral) grids. A property, such as permeability or water saturation, is assigned to each cell or grid block of the grid. As a result, a set of output data is generated by the gridding software, the set of output data including the plurality of cells/grid blocks of the grid and the respective plurality of properties associated with each of the cells of the grid. The set of output data from the gridding software are introduced, as input data, to a reservoir simulator software. The reservoir simulator software will respond to the set of output data from the gridding software by generating a plurality of simulation results which are associated, respectively, with the plurality of cells/grid blocks of the grid received from the gridding software. The plurality of simulation results and the plurality of cells/grid blocks associated therewith, generated by the reservoir simulator software, will be displayed on a 3D viewer of the workstation for observation by a workstation operator. Alternatively, the plurality of simulation results and the plurality of cells/grid blocks associated therewith can be recorded for observation by a workstation recorder.

The reservoir simulator software can model an oilfield reservoir. For example, in the Society of Petroleum Engineers (SPE) publication number 28545, concerning a transient tool for multiphase pipeline and well simulation, dated 1994, the authors have solved for pressure losses along a single pipeline using a technique related to conservation of material and conservation of pressure.

A similar technique has been applied to a network of pipelines or flowlines in the Society of Petroleum Engineers (SPE) publication number 29125, authored by Litvak and Darlow. In this publication, the authors (Litvak and Darlow) have taken a network model (i.e., a network of pipelines) in which the pressure losses along the network branches can either be calculated from tables or from an analytical model, and the analytical model solves for three (3) conservations and pressures. In addition, in an article by the "Society of Petroleum Engineers" (SPE) 12259, each well being modeled in that article was characterized by three (3) variables: pressure, water fraction, and gas fraction.

As noted above, the set of output data from the gridding software (including the plurality of cells/grid blocks of the grid and the respective plurality of properties associated with each of the cells of the grid) are introduced, as input data, to the reservoir simulator software, and, responsive thereto, the reservoir simulator will generate a first set of simulation results which will be displayed for viewing by an operator. Another set of input data will subsequently be input to the reservoir simulator, and a second set of simulation results will be displayed for viewing by the operator. Still another set of input data will subsequently be input to the reservoir simulator, and a third set of simulation results will be displayed for viewing by the operator.

However, advances in technology over the last few years have meant that today's reservoir engineer is faced with managing more data and making better informed decisions in a shorter time than ever before. Technology has enabled more data to be incorporated, more complex models to be built, and more realizations to be studied. As a result, more data must be managed, more models must be created, and more results must be analyzed. Consequently, a reservoir engineer must continuously remember and keep track of a multitude of sets of input data which are being input to a reservoir simulator.

Therefore, some type of method and apparatus for automatically organizing and managing the input data (which are being input to the reservoir simulator) is necessary, and that apparatus would allow the reservoir engineer to efficiently manage the input data while creating new models and analyzing the results generated from those models.

SUMMARY OF THE INVENTION

Accordingly, it is a primary object of the present invention to provide a new and novel method and apparatus, hereinafter called a "case manager", for automatically organizing and managing a plurality of sets of input data which are being provided to a reservoir simulator in order to allow a reservoir engineer to efficiently organize and manage that input data while creating new models and analyzing a plurality of sets of results generated from those new models.

In accordance with the above referenced object, it is a primary aspect of the present invention to provide a simulation system and associated method, which is responsive to a plurality of sets of input data, for simulating an earth formation located in the vicinity of an oilfield reservoir, generating a set of simulation results in response to the simulation, and displaying the set of simulation results, the simulation system including a case manager adapted for organizing and managing the plurality of sets of input data being used by the simulation system.

It is a further aspect of the present invention to provide the above referenced simulation system, wherein the case manager includes a plurality of case scenarios organized in a tree-like structure, some case scenarios being supersets of other case scenarios in the tree-like structure, an operator selecting one or more of the case scenarios in the case manager for submission to a simulator.

It is a further aspect of the present invention to provide the above referenced simulation system, wherein the simulation system further includes a case builder adapted for receiving the one or more of the case scenarios selected by the operator via the case manager, editing and/or changing a set of data disposed within the selected case scenarios in response to editing actions taken by the operator, and, responsive thereto, for generating a set of edited case scenarios for submission to the simulator.

It is a further aspect of the present invention to provide the above referenced simulation system, wherein the simulation system further includes said simulator adapted to be executed, a run manager interposed between the case builder and the simulator and responding to the set of edited case scenarios from the case builder for submitting the edited case scenarios from the case builder to the simulator and monitoring the edited case scenarios submitted to the simulator, and a results viewer/report generator for viewing and reporting the simulation results generated by the simulator, the simulator using the edited case scenarios during its execution to thereby generate a set of simulation results, the set of simulation results from the simulator being stored in a results file, the results viewer displaying the set of simulation results stored in the results file, the set of simulation results in the results file being transmitted back to the run manager, the run manager enabling the operator to compare the edited case scenarios being submitted by the case builder to the simulator with the set of simulation results generated by the simulator and stored in the results file thereby allowing the operator to select one or more additional case scenarios via the case manager, as desired, for submission to the case builder, to the run manager, and to the simulator.

It is a further aspect of the present invention to provide the above referenced simulation system, wherein the simulation system responds to the set of simulation results generated by the simulator by displaying or reporting those simulation results, the simulation system including the results viewer for displaying the set of simulation results generated by the simulator and a report generator for generating one or more reports which record the set of simulation results, the results viewer displaying not only the set of simulation results but also any instantaneous changes being made to the set of simulation results at any point in time.

In accordance with these and other aspects of the present invention, a "simulation system" includes a workstation and a simulator (called "Eclipse") which is a software package that is adapted to be stored in a memory of the workstation. The "Eclipse" simulator is originally stored on a CD-Rom, the simulator being subsequently loaded from the CD-Rom and stored in the memory of the workstation. The simulator will respond to certain "input data" during the pendency of its execution, and a resultant set of simulation results will be displayed on a 3D viewer.

In a prior pending application, a gridding software, known as "Flogrid", generated a set of output data, the set of output data including a plurality of cells/grid blocks of a grid and a respective plurality of properties associated with each of the cells of the grid. The set of output data from "Flogrid" are introduced, as the "input data", to the simulator. The simulator responds to that "input data" by generating a plurality of simulation results which are associated, respectively, with the plurality of cells/grid blocks of the grid received from the "Flogrid" gridding software. The plurality of simulation results and the plurality of cells/grid blocks associated respectively therewith, generated by the simulator, are displayed on a 3D viewer of a workstation for observation by a workstation operator. The prior pending application is U.S. patent application Ser. No. 09/034,701, filed in the U.S. on Mar. 4, 1998 based on Great Britain patent application number 9727288.4 filed Dec. 24, 1997, the disclosure of which has already been incorporated by reference into this specification.

However, in addition to the "Eclipse" simulator, the "simulation system" further includes a "display means" operatively connected to the simulator for displaying or reporting the set of simulation results generated by the simulator and an "organizing and managing system" (known as "Eclipse Office"), in accordance with the present invention, operatively interconnected between the Flogrid gridding software and the simulator for organizing and managing the "input data" from the gridding software that is ultimately input to the simulator and for enabling a comparison of the set of simulation results generated by the simulator with other types of the "input data". The Eclipse Office "organizing and managing system", in accordance with the present invention, further includes the following components: a case/project manager in accordance with one aspect of the present invention adapted for organizing and managing a set of input data being introduced as input data to the simulator, the case manager organizing and managing the set of input data by storing the set of input data in the case manager in the form of a "tree like structure", a case builder/data manager, a run manager, and a results file. The "display means" is operatively connected to the results file and further includes a results viewer and a report generator.

In operation, the case/project manager of the simulation system in accordance with one aspect of the present invention stores a plurality of different scenarios of test "input data", that test "input data" being stored in the case/project manager in the form of a "tree-like" structure. As a result of the tree-like structure, the case/project manager will neatly organize and manage, for the operator, the test input data thereby enabling an operator of the workstation to select one or more of the different sets or supersets of the test input data stored in the tree like structure for introduction to the simulator. When the operator selects one or more of the test input data in the tree like structure of the case/project manager, that input data is temporarily stored in the case builder/data manager. The operator can now edit, via the case builder, the test input data that is temporarily stored in the case builder/data manager. Alternatively, other input data from other "pre-processor" programs (in addition to the input data from "Flogrid") can be temporarily stored in the case builder/data manager and can be edited by the operator via the case builder/data manager. Alternatively, other "raw data" can be temporarily stored in the case builder/data manager and the operator can edit, via the case builder, that other raw data. When the "input data" in the case builder/data manager has been edited as desired by the operator, that "edited input data" is sent to the run manager, the run manager submitting that "edited input data" to the simulator. The run manager will monitor the "edited input data" submitted to the simulator. A processor of the workstation will execute the simulator software and, during that execution, the processor will simultaneously use the "edited input data" supplied to the simulator by the run manager. When the execution of the simulator software is complete, a "set of simulation results" will be generated by the simulator. That "set of simulation results" will be stored in a "results file" of the simulation system. That "set of simulation results" stored in the "results file" will be transmitted back to the run manager where the operator will be able to compare via the run manager the "set of simulation results" stored in the results file with the "edited input data" being supplied by the case builder to the simulator. In addition, the "set of simulation results" stored in the results file will be simultaneously transmitted from the results file to the results viewer thereby allowing the workstation operator to view the "set of simulation results" stored in the results file. Based on that comparison, the operator at the workstation can then select "other test input data" stored in the tree like structure of the case/project manager and run that "other test input data" through the simulator in order to generate "other sets of simulation results" which can be stored in the results file and monitored via the run manager. That "other set of simulation results" from the results file can be sent to a results viewer on a workstation display for displaying the "other set of simulation results" and the "other set of simulation results" can be sent to a report generator for recording that "other set of simulation results" in the form of a written report that can be provided to the operator.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 3, 4a, and 4b illustrate a more detailed construction of the data reduction operation of FIG. 1;

FIG. 5 illustrates a wellbore operation for producing a well log output record;

FIG. 22a1 to 22a2 illustrates a workflow or functional block diagram of the case builder/data manager of the Eclipse Office software of the present invention;

FIG. 22b1 to 22b2 illustrates a continuation of the workflow or functional block diagram of FIG. 22a of the case builder/data manager of the Eclipse Office software of the present invention;

FIG. 23 illustrates a dialog depicting the case builder/data manager layout;

FIG. 30 illustrates a workflow or functional block diagram of the results viewer of FIG. 13.

DETAILED DESCRIPTION OF THE PREFERRED EMBODIMENT

Figure 1:
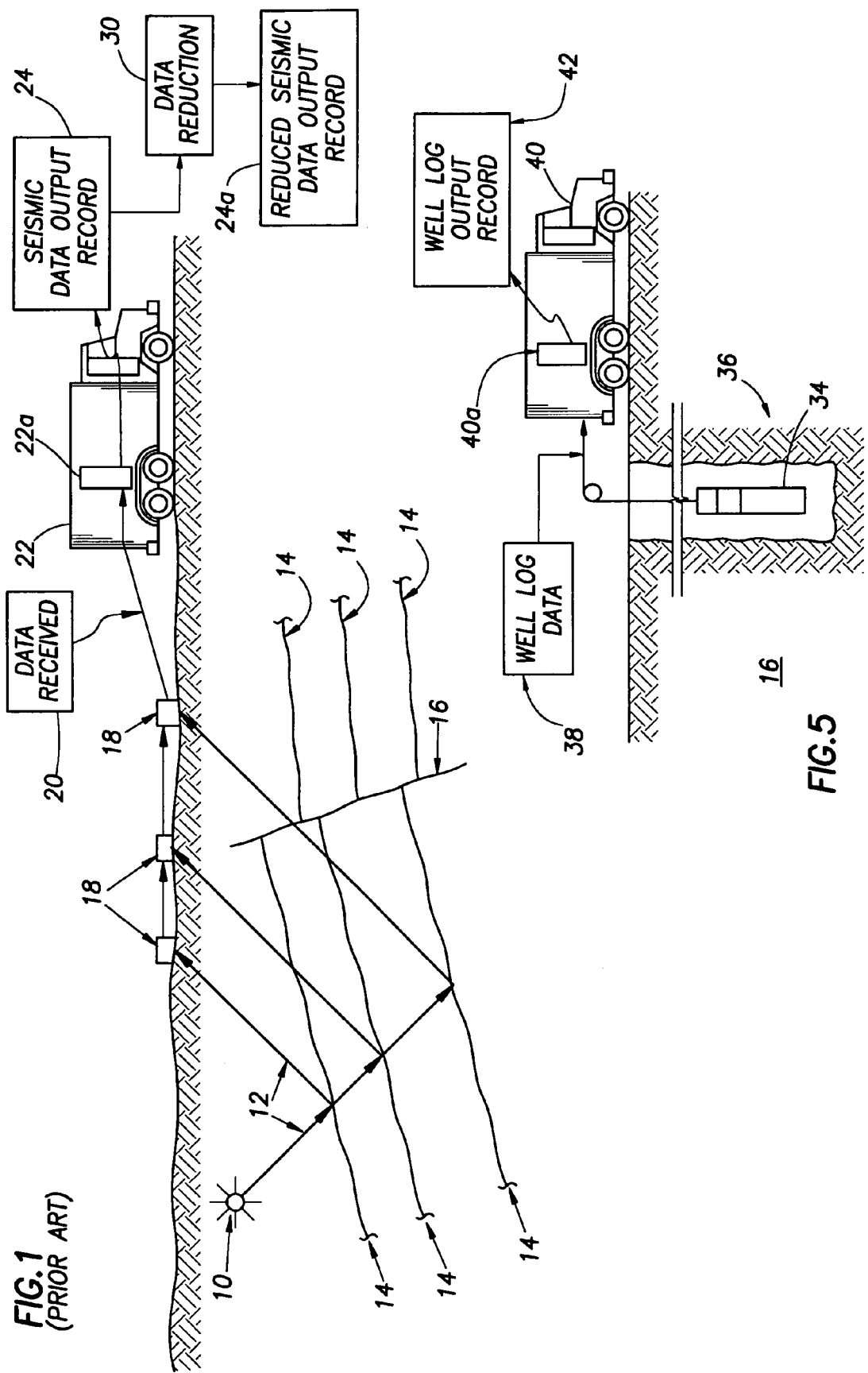
FIGS. 1 and 2 illustrate a seismic operation for producing a reduced seismic data output record, the seismic operation of FIG. 1 including a data reduction operation.

Referring to FIG. 1, a method and apparatus for performing a seismic operation is illustrated. During a seismic operation, a source of acoustic energy or sound vibrations 10, such as an explosive energy source 10, produces a plurality of sound vibrations. In FIG. 1, one such sound vibration 12 reflects off a plurality of horizons 14 in an earth formation 16. The sound vibration(s) 12 is (are) received in a plurality of geophone-receivers 18 situated on the earth's surface, and the geophones 18 produce electrical output signals, referred to as "data received" 20 in FIG. 1, in response to the received sound vibration(s) 12 representative of different parameters (such as amplitude and/or frequency) of the sound vibration(s) 12. The "data received" 20 is provided as "input data" to a computer 22a of a recording truck 22, and, responsive to the "input data", the recording truck computer 22a generates a "seismic data output record" 24. Later in the processing of the seismic data output record 24, such seismic data undergoes "data reduction" 30 in a mainframe computer, and a "reduced seismic data output record" 24a is generated from that data reduction operation 30.

Figure 2:
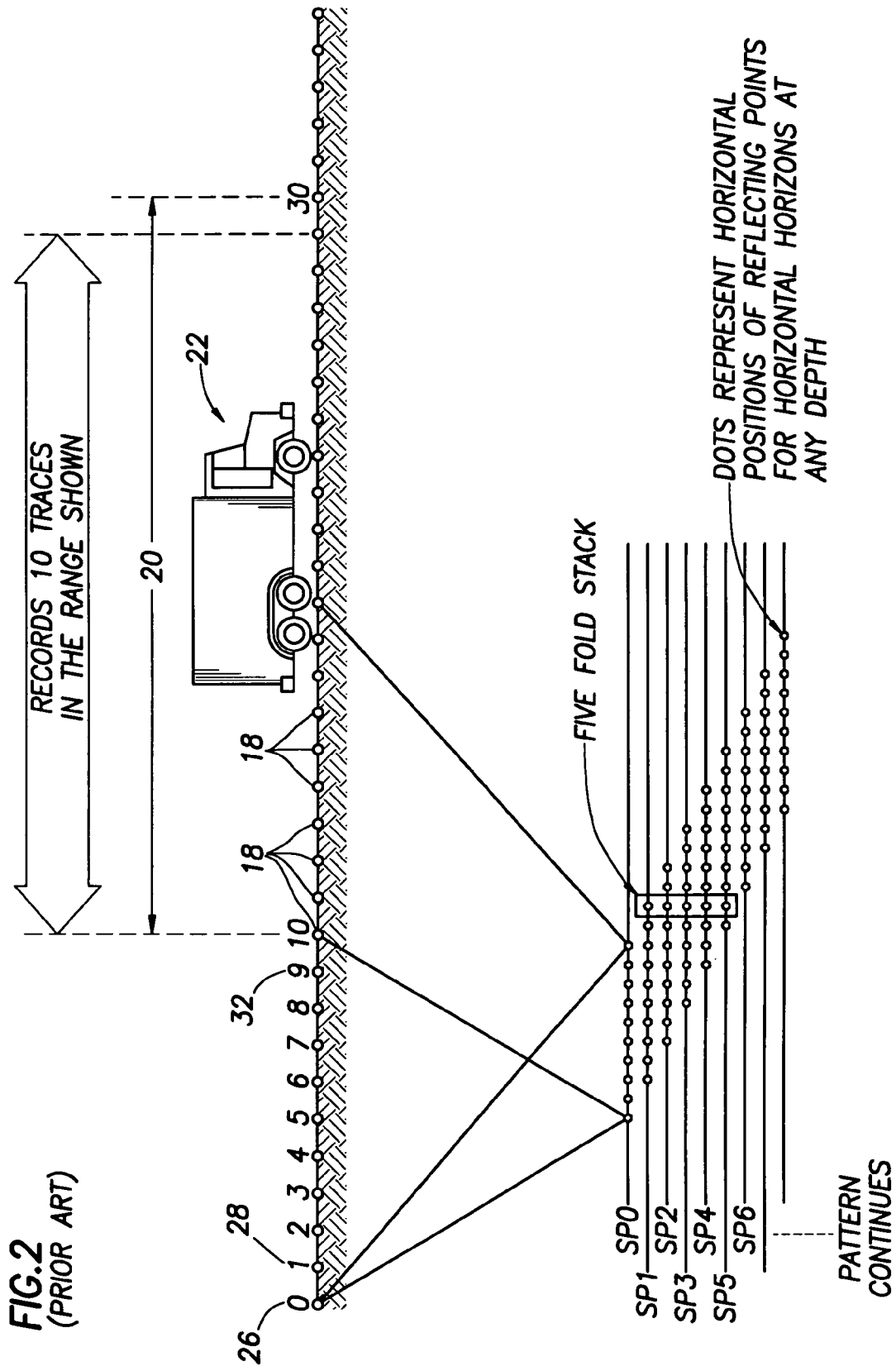

Referring to FIG. 2, another method and apparatus for performing a seismic operation is illustrated. FIG. 2 was taken from a book entitled "Seismic Velocity Analysis and the Convolutional Model", by Enders A. Robinson, the disclosure of which is incorporated by reference into this specification.

In FIG. 2, the seismic operation of FIG. 1 is performed 10 different times. For example, when the explosive or acoustic energy source 10 is located at position 26 (the first position or position "0" along the surface of the earth) in FIG. 2, a first plurality of electrical signals from the geophones 18 are stored in the computer 22a in the recording truck 22. The explosive energy source is moved to position 28. When the explosive energy source 10 is located in position 28 (the second position or position "1" along the surface of the earth), a second plurality of electrical signals are stored in the computer 22a in the recording truck 22. The explosive energy source 10 is repeatedly and sequentially moved from positions "2" to "9" in FIG. 2 until it is located at position 32 (i.e.—position "9" which is the tenth position) on the surface of the earth. When the explosive energy source 10 is located in position 32 (the tenth position along the surface of the earth), a tenth plurality of electrical signals are stored in the computer 22a in the recording truck 22. As a result, in FIG. 2, the recording truck 22 of FIG. 1 records a "set of 3D seismic data" which consists of the 10 traces or ten sets of electrical signals, where each set of electrical signals comprises a plurality of electrical signals that originated from subsurface locations situated between position 26 and position 32 along the surface of the earth. A seismic data output record 24 will be generated by the computer 22a in the recording truck 22 which includes the "set of 3D seismic data" received from the geophones 18. The method and apparatus described above with reference to FIGS. 1 an 2 represent a "3D seismic operation".

Figure 3:
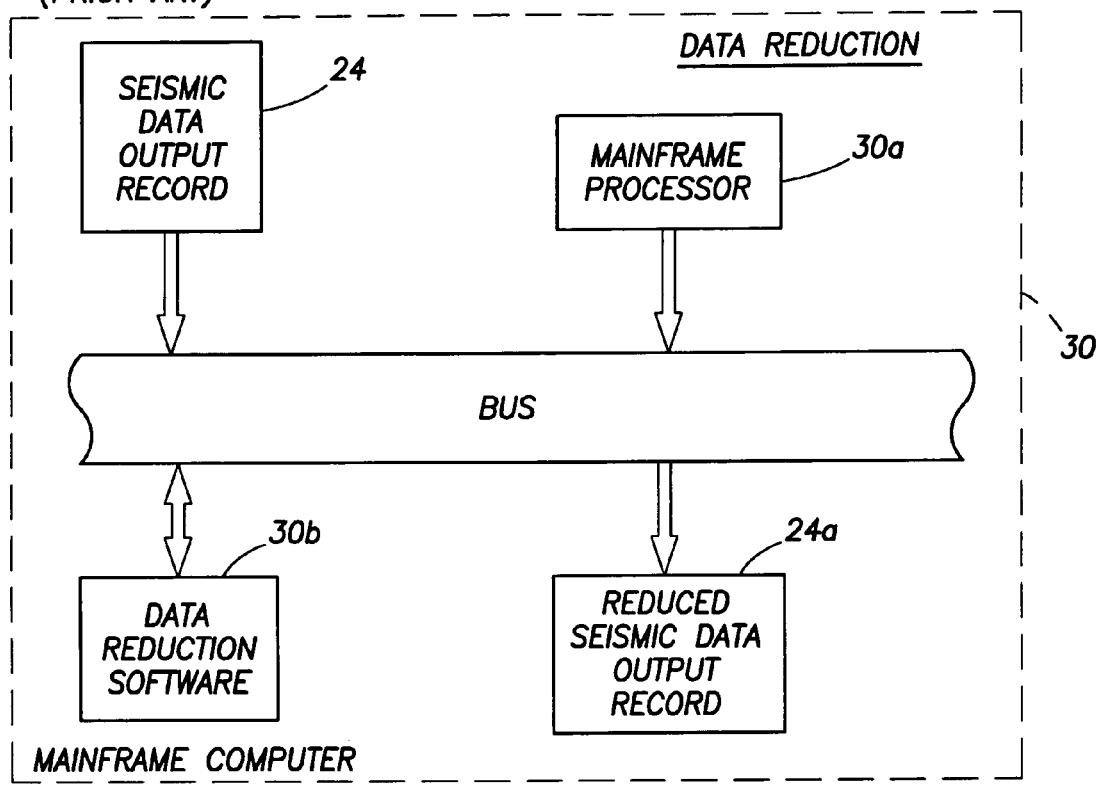

Referring to FIG. 3, the seismic data output record 24 of FIG. 1 is provided as "input data" to a mainframe computer 30 where the data reduction operation 30 of FIG. 1 is performed. A mainframe processor 30a will execute a data reduction software 30b stored in a mainframe storage 30b. When the execution of the data reduction software 30b is complete, the reduced seismic data output record 24a of FIGS. 1 and 3 is generated.

Figure 4A:
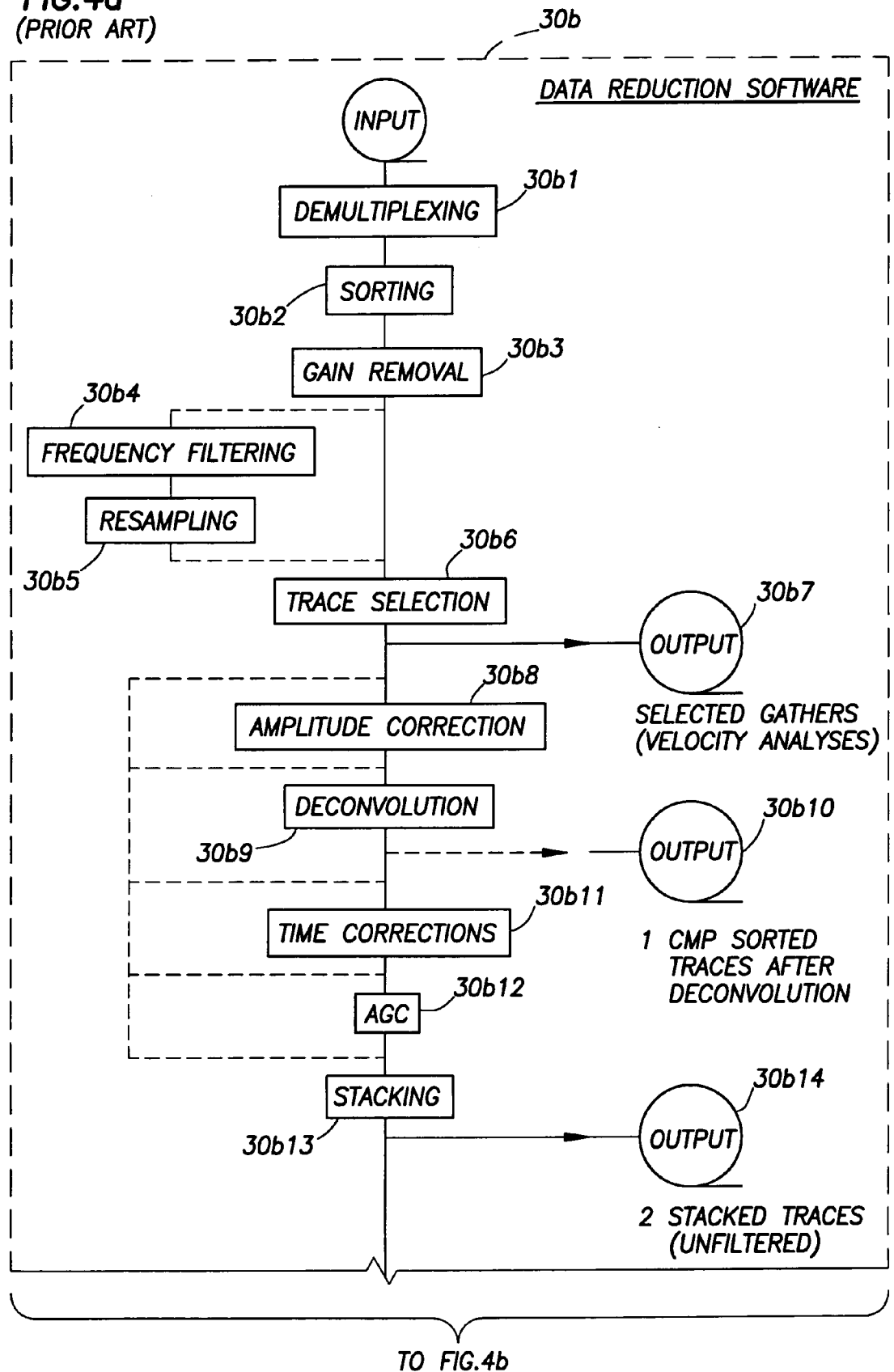

Referring to FIGS. 4a and 4b, a flowchart of the data reduction software 30b stored in the mainframe storage 30b of the mainframe computer 30 of FIG. 3 is illustrated. The data reduction software flowchart of FIGS. 4a and 4b is taken from a book entitled "Seismic Velocity Analysis and the Convolutional Model" by Enders A. Robinson, the disclosure of which has already been incorporated by reference into this specification.

In FIGS. 4a and 4b, the flowchart of the data reduction software 30b includes the following blocks: a demultiplexing block 30b1 connected to the input, a sorting block 30b2, a gain removal block 30b3, a frequency filtering block 30b4, a resampling block 30b5, a trace selection block 30b6, an output 30b7 labelled "selected gathers (velocity analyses)", amplitude correction 30b8, deconvolution 30b9, a second output 30b10 labelled "CMP sorted traces after deconvolution", a time corrections block 30b11, an AGC block 30b12, a stacking block 30b13, a third output 30b14 labelled "stacked traces (unfiltered)", a frequency filtering block 30b15, another AGC block 30b16, a fourth output 30b17 labelled "stacked traces (filtered)", a second input labelled "dip information" 30b18, a trace interpolation block 30b19, a migration block 30b20, a fifth output 30b21 labelled "migrated traces (unfiltered)", a frequency filtering block 30b22, an AGC block 30b23, a sixth output 30b24 labelled "migrated traces (filtered)", a time to depth correction block 30b25, and a seventh output 30b26 labelled "migrated traces (depth migrated)". In the flowchart of FIGS. 4a and 4b, any of the outputs 30b7, 30b10, 30b14, 30b17, 30b21, 30b24, and 30b26 can be used as the "reduced seismic data output record" 24a which is being provided as input data to the workstation discussed below and illustrated in FIGS. 7 and 10 of the drawings.

Referring to FIG. 5, a well logging operation is illustrated. During the well logging operation, a well logging tool 34 is lowered into the earth formation 16 of FIG. 1 which is penetrated by a borehole 36. In response to the well logging operation, well log data 38 is generated from the well logging tool 34, the well log data 38 being provided as "input data" to a computer 40a of a well logging truck 40. Responsive to the well log data 38, the well logging truck computer 40a produces a "well log output record" 42.

Figure 6:
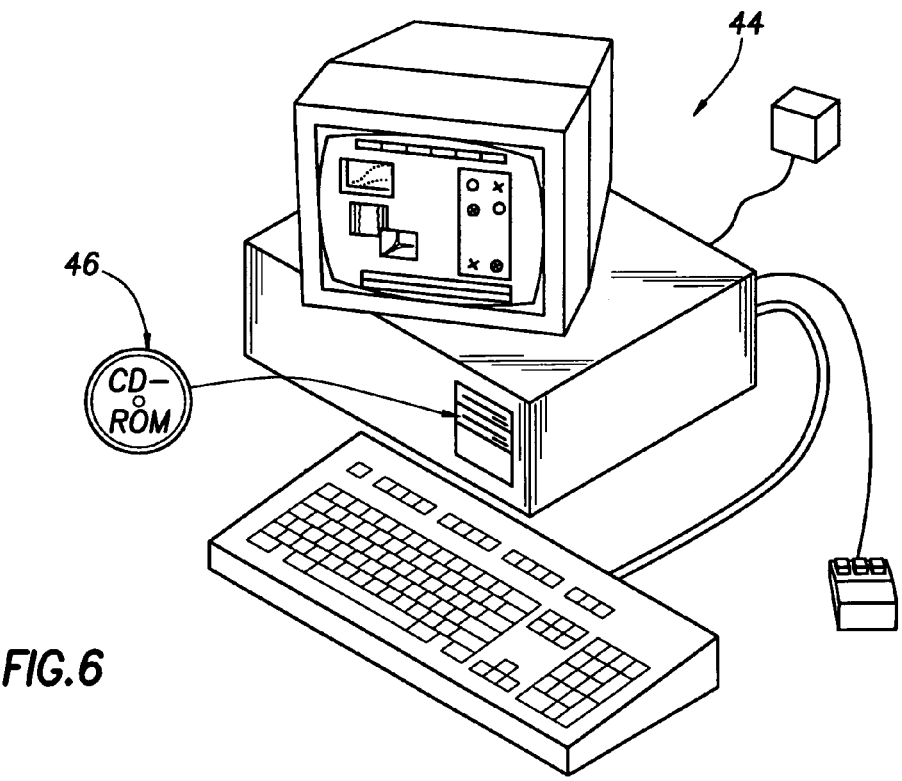
FIGS. 6 and 7 illustrate a workstation adapted for storing a "Flogrid" software and an "Eclipse" simulator software.
Figure 7:
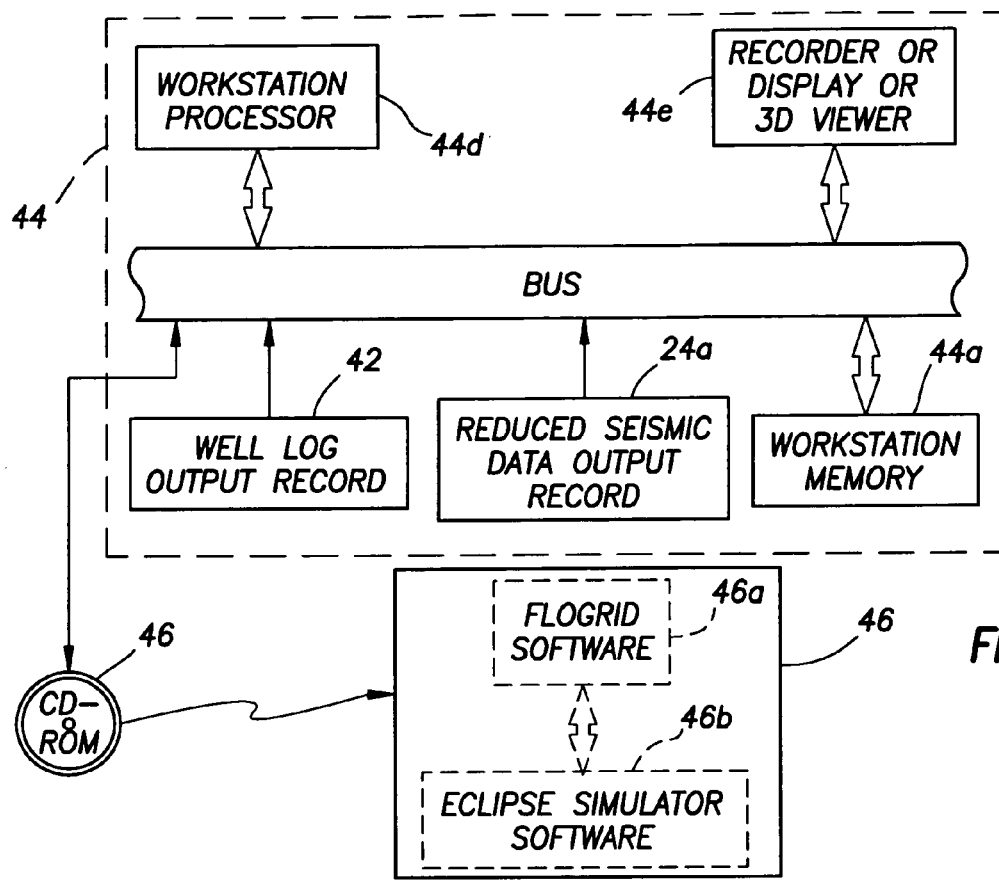

Referring to FIGS. 6 and 7, a workstation 44 is illustrated in FIG. 6. A storage medium 46, such as a CD-Rom 46, stores software, and that software can be loaded into the workstation 44 for storage in the memory of the workstation. In FIG. 7, the workstation 44 includes a workstation memory 44a, the software stored on the storage medium (CD-Rom) 46 being loaded into the workstation 44 and stored in the workstation memory 44a. A workstation processor 44d will execute the software stored in the workstation memory 44a in response to certain input data provided to the workstation processor 44d, and then the processor 44d will display or record the results of that processing on the workstation "recorder or display or 3D viewer" 44e. The input data, that is provided to the workstation 44 in FIG. 7, includes the well log output record 42 and the reduced seismic data output record 24a. The "well log output record" 42 represents the well log data generated during the well logging operation in an earth formation of FIG. 5, and the "reduced seismic data output record" 24a represents data-reduced seismic data generated by the mainframe computer 30 in FIG. 3 in response to the seismic operation illustrated in FIG. 1. In FIG. 7, the software stored on the storage medium (CD-Rom) 46 in FIG. 7 includes a "Flogrid" software 46a and an "Eclipse" simulator software 46b. When the storage medium (CD-Rom) 46 is inserted into the workstation 44 of FIG. 7, the "Flogrid" software 46a and the "Eclipse" simulator software 46b, stored on the CD-Rom 46, are both loaded into the workstation 44 and stored in the workstation memory 44a. The "Flogrid" software 46a is fully described and set forth in pending U.S. patent application Ser. No. 09/034,701, filed in the U.S. on Mar. 4, 1998, which is based on prior pending Great Britain patent application number 9727288.4 filed Dec. 24, 1997, the disclosure of which is incorporated by reference into this specification. When the workstation processor 44d executes the Flogrid software 46a and the Eclipse simulator software 46b, the "Eclipse" simulator software 46b responds to a set of more accurate grid cell property information associated with a respective set of grid blocks of a structured simulation grid generated by the "Flogrid" software 46a by further generating a set of more accurate simulation results which are associated, respectively, with the set of grid blocks of the simulation grid. Those simulation results are displayed on the 3D viewer 44e of FIG. 7 and can be recorded on a recorder 44e.

Figure 8:
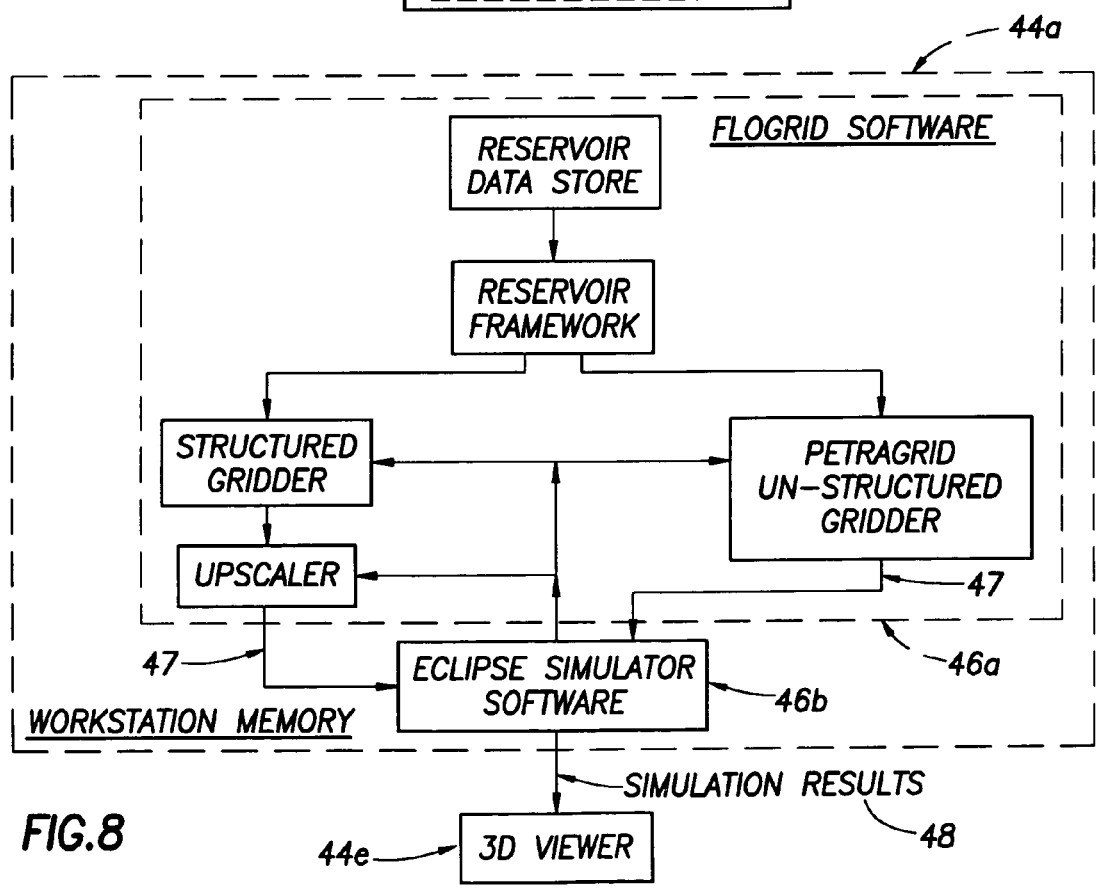
FIG. 8 illustrates a more detailed construction of the "Flogrid" software of FIG. 7.
Figure 9:
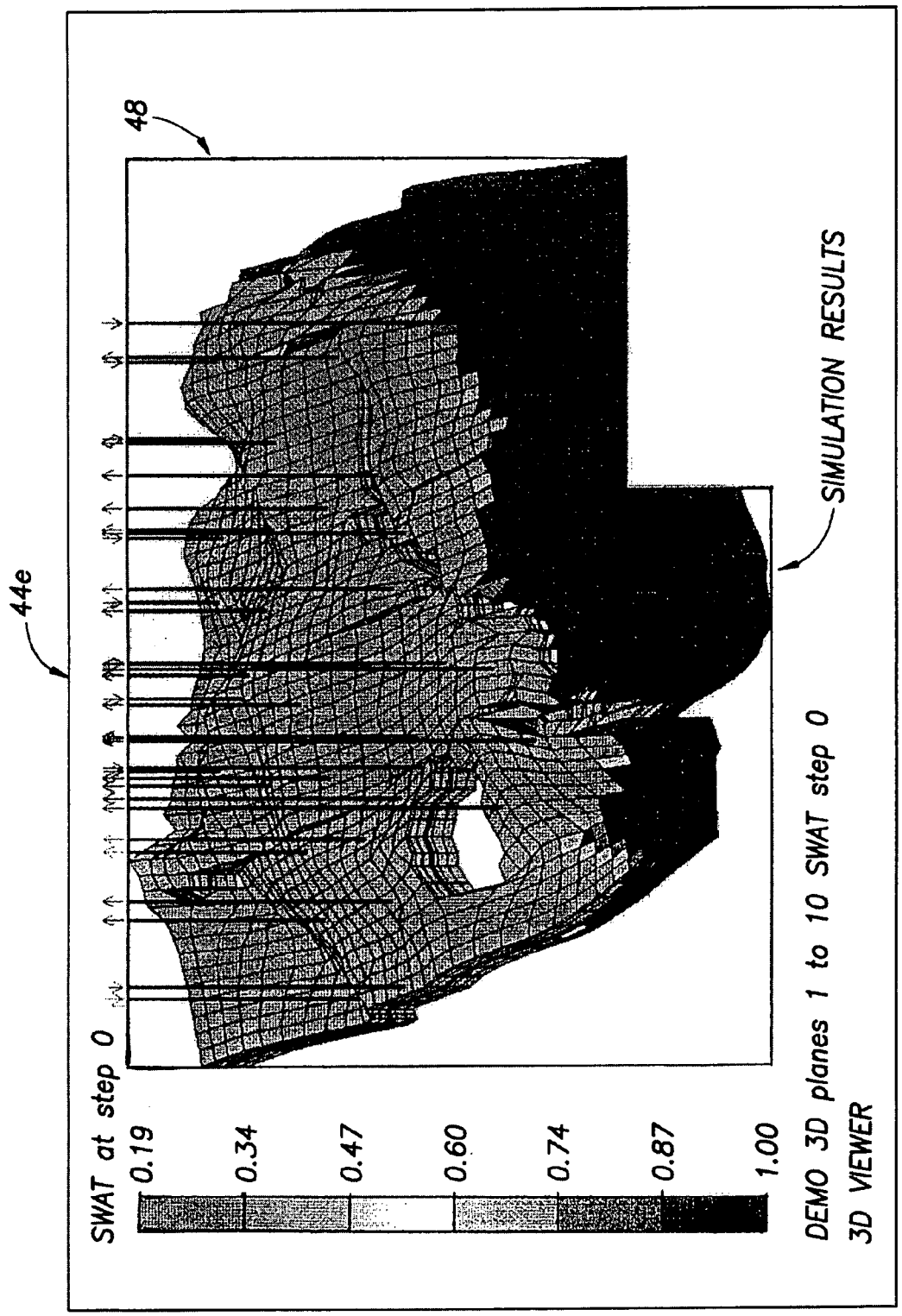
FIG. 9 illustrates an example of a typical output display generated by the "Eclipse" simulator software of FIG. 8 and produced on the 3D viewer of FIG. 8.

Referring to FIGS. 8 and 9, referring initially to FIG. 8, the Flogrid software 46a and the Eclipse simulator software 46b are illustrated as being stored in the workstation memory 44a of FIG. 7. In addition, in FIG. 8, the "simulation results", which are output from the Eclipse simulator software 46b in FIG. 8, are illustrated as being received by and displayed on the 3D viewer 44e of FIG. 7.

In FIG. 8, the Flogrid software 46a includes a reservoir data store, a reservoir framework, a structured gridder, an unstructured gridder, and an upscaler, all of which are fully discussed in the above referenced prior pending U.S. patent application Ser. No. 09/034,701, filed in the U.S. on Mar. 4, 1998, the disclosure of which has already been incorporated by reference into this specification. A set of "simulation grids and properties associated with the grids" 47, generated by the upscaler and the "Petragrid" unstructured gridder, are received in the Eclipse simulator software 46b. In response, the Eclipse simulator software 46b generates a "set of simulation results associated, respectively, with a set of grid blocks of the simulation grids" 48, and the simulation results and the associated grid blocks 48 are displayed on the 3D viewer 44e.

In FIG. 9, an example of the "set of simulation results associated, respectively, with a set of grid blocks of the simulation grids" 48, which are displayed on the 3D viewer 44e of the workstation 44 of FIGS. 6, 7, and 8, is illustrated.

Referring to FIGS. 10 through 17, the Eclipse Office software of the present invention is discussed in the following paragraphs with reference to FIGS. 10 through 17 of the drawings.

Figure 10:
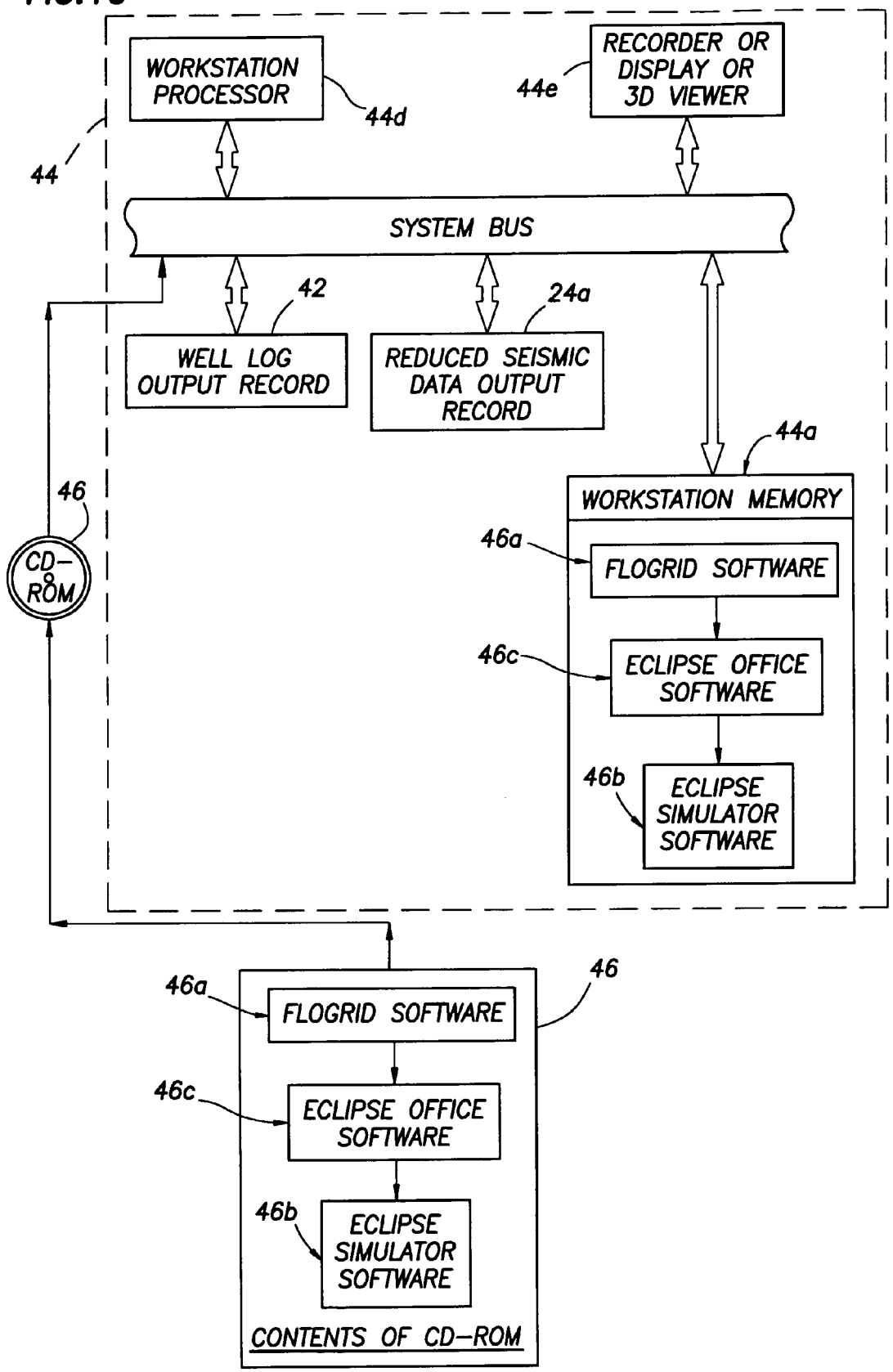
FIG. 10 illustrates the workstation of FIGS. 6, and 7, however, the workstation memory of FIG. 10 stores the Flogrid software, the Eclipse Office software in accordance with the present invention, and the Eclipse simulator software, all of the aforementioned software being loaded into the workstation from a program storage device, such as a CD-Rom.

In FIG. 10, the workstation 44 of FIG. 7 is illustrated again. However, in FIG. 10, the storage medium (CD-Rom) 46 stores the Flogrid software 46a, the Eclipse simulator software 46b, and the Eclipse Office software 46c of the present invention interposed between the Flogrid software 46a and the Eclipse simulator software 46b. When the CD-Rom 46 is inserted into the workstation 44, the Eclipse Office software 46c in addition to the Flogrid software 46a and the Eclipse simulator software 46b are loaded from the storage medium (CD-Rom) 46 into the workstation memory 44a of FIG. 10. As a result, as shown in FIG. 10, the workstation memory 44a now stores three software packages: the Flogrid software 46a, the Eclipse office software 46c of the present invention, and the Eclipse simulator software 46b.

Figure 11:
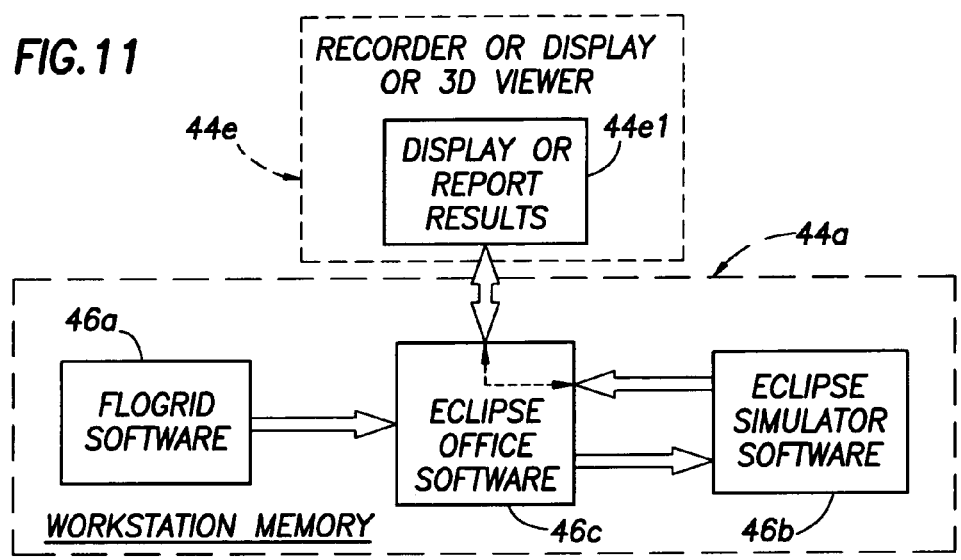
FIGS. 11 and 12 illustrate the contents of the workstation memory of FIG. 10 and how the Eclipse Office software of the present invention interfaces between the Flogrid software, the Eclipse simulator software, and the workstation's 3D viewer of FIG. 10 which displays or reports results.

In FIG. 11, the Flogrid software 46a, the Eclipse office software 46c and the Eclipse simulator software 46b stored in the workstation memory 44a of FIG. 10 is again illustrated. In operation, referring to FIG. 11, the Flogrid software 46a passes certain data files to the Eclipse office software 46c of the present invention. In response, the Eclipse office software 46c passes edited versions of those same data files to the Eclipse simulator software 46b. When the Eclipse simulator software 46b is executed by the workstation processor 44d of FIG. 10, the simulator software 46b uses the edited versions of the data files received from the Eclipse office software 46c. In response, simulation results are generated by the Eclipse simulator software 46b, and those simulation results are passed back to the Eclipse office software 46c, the Eclipse office software 46c displaying the simulation results on a recorder or display or 3D viewer 44e. The recorder or display or 3D viewer 44e functions to "display or report results" 44e1. Consequently, the simulation results generated by the Eclipse simulator software 46b and passed through the Eclipse office software 46c will be displayed or reported via the "display or report results" 44e1 in FIG. 11.

Figure 12:
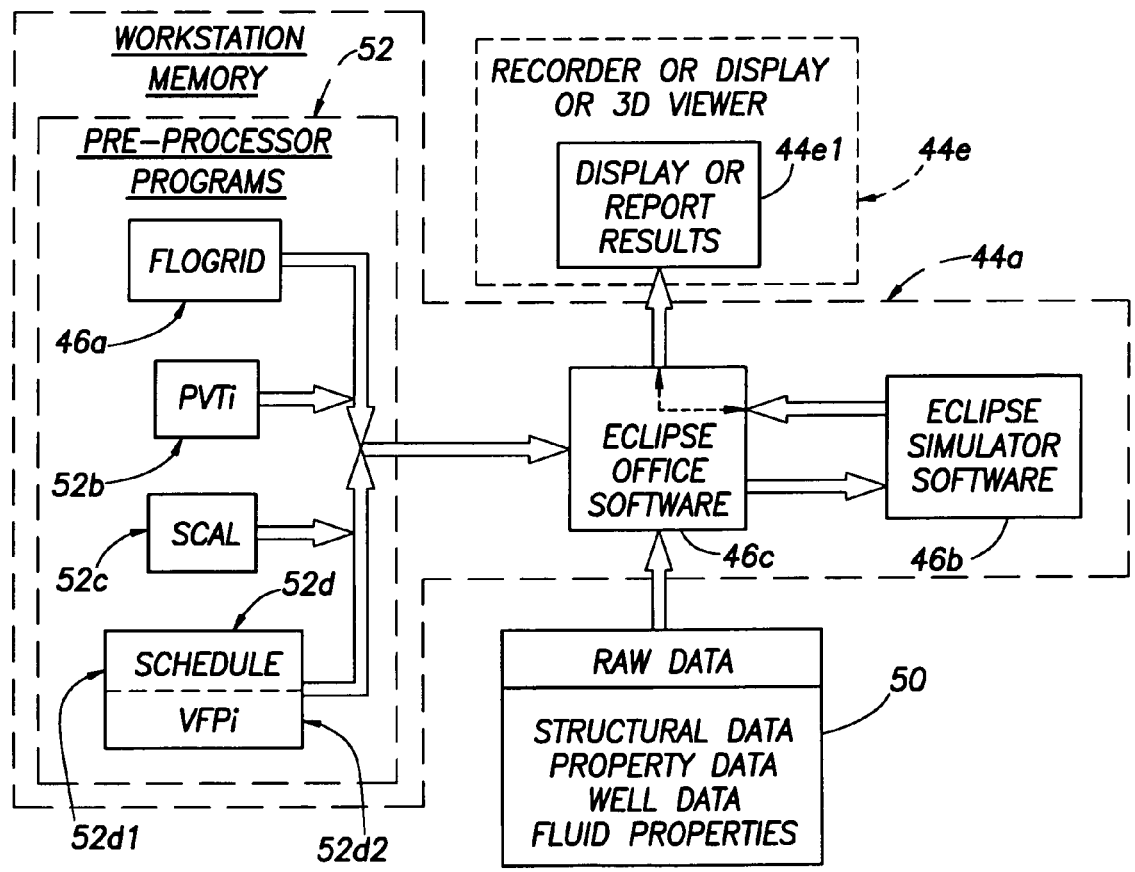
Figure 13:
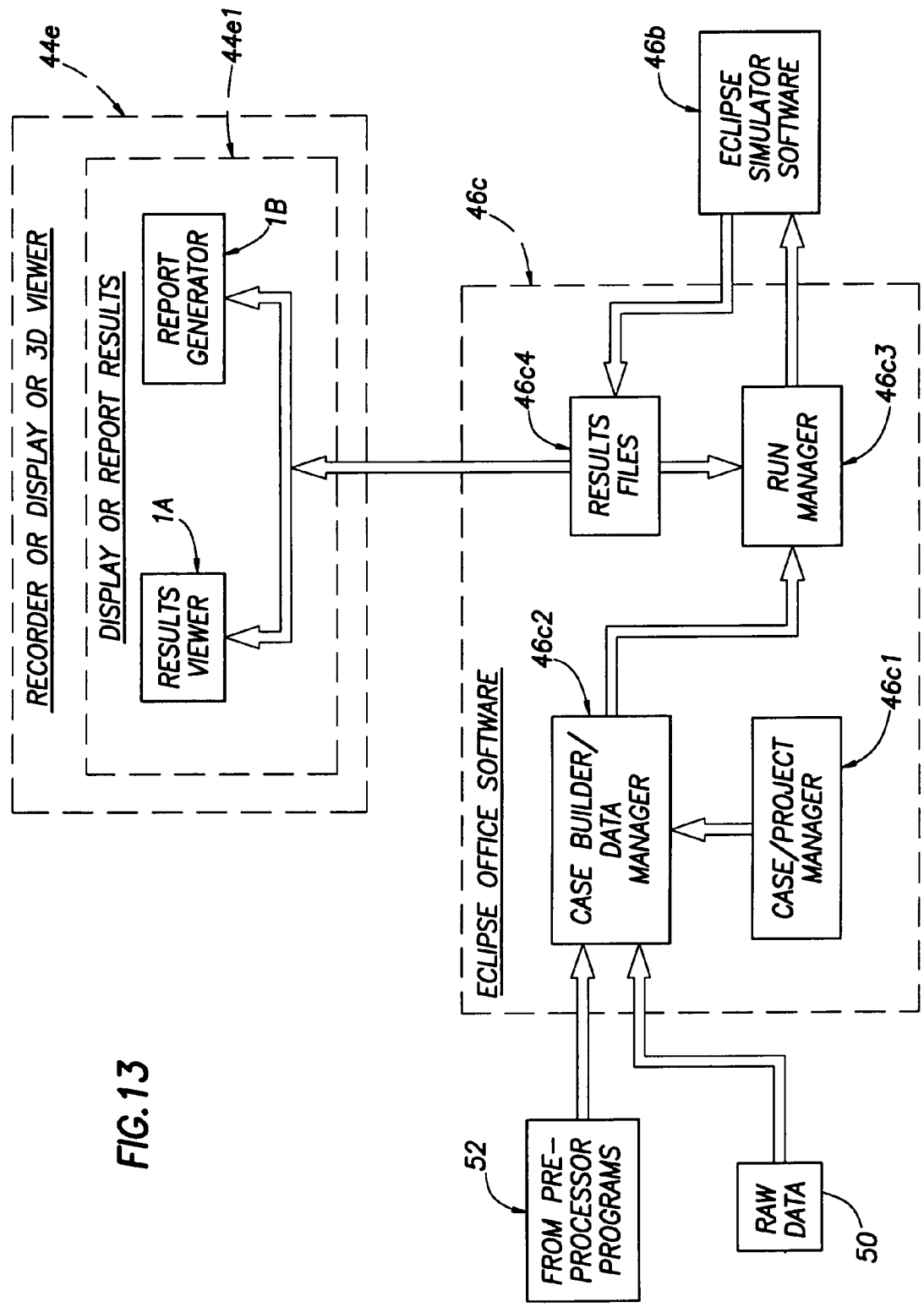
FIG. 13 illustrates a more detailed construction of the "display or report results" of FIGS. 11 and 12 of the "recorder or display or 3D viewer" of FIG. 10, FIG. 13 further illustrating a more detailed construction of the Eclipse Office software of the present invention stored in the workstation memory of FIG. 10 which includes the case/project manager in accordance with the present invention, the case builder, the run manager, and the results files.

In operation, in FIG. 12, the Eclipse Office software 46c receives the data files associated with the raw data 50 and the data files generated by the pre-processor programs 52 and, responsive thereto, the Eclipse Office software 46c will collect all such data files and pass edited versions of such data files to the Eclipse simulator software 46b. The Eclipse simulator software 46b is executed by workstation processor 44d of FIG. 10. However, during the execution of the Eclipse simulator software 46b by the workstation processor 44d of FIG. 10, the Eclipse simulator software 46b will receive and utilize the data files associated with the raw data 50 of FIG. 12 and/or the data files generated by the pre-processor programs 52 of FIG. 12; and, during that execution of the Eclipse simulator software 46b, in response to these aforementioned data files, the Eclipse simulator software 46b will be generating a "set of simulation results". That "set of simulation results" will be passed back from the Eclipse simulator software 46b to the Eclipse Office software 46c. When the Eclipse Office software 46c receives that "set of simulation results", the Eclipse Office software 46c will be re-transmitting that "set of simulation results" to the "recorder or display or 3D viewer" 44e of FIGS. 10 through 12 for displaying and/or recording that "set of simulation results" on the 3D viewer 44e at each instantaneous point in time. Bear in mind that the "set of simulation results" will be generated from the Eclipse simulator software 46b during its execution by the workstation processor 44d, and that "set of simulation results" will be instantaneously displayed, by the Eclipse Office software 46c at each point in time, on the "recorder or display or 3D viewer" 44e of FIG. 12. As a result, the Eclipse Office software 46c will instantaneously "display or report results" 44e1 in response to the raw data files 50 and/or in response to the data files provided by the pre-processor programs 52, both during and after the execution of the Eclipse simulator software 46b by the workstation processor 44d. Refer now to FIG. 13 for a more complete description of this functional operation.

The SCAL 52c pre-processor program 52, licensed and/or sold by GeoQuest, a division of Schlumberger Technology Corporation, is a tool to help engineers effectively use lab derived relative permeability and capillary pressure measurements in reservoir simulation. The Schedule 52d1 pre-processor program 52, also licensed and/or sold by GeoQuest, a division of Schlumberger Technology Corporation, enables engineers to accurately and efficiently prepare well production and completion data that is used by the Eclipse simulator software 46b. The Schedule program 52d1 helps users to access well data from industry standard and company databases and transform it into well and group control keywords that the Eclipse simulator software 46b understands. The VFPi pre-processor program 52d2 ("Vertical Flow Performance Modeling Program") enables engineers to construct the comprehensive lift curves used by the Eclipse simulator software 46b to calculate pressure losses in wells and gathering system networks.

In operation, in FIG. 12, the Eclipse Office software 46c receives the data files associated with the raw data 50 and the data files generated by the pre-processor programs 52 and, responsive thereto, the Eclipse Office software 46c will collect all such data files and pass edited versions of such data files to the Eclipse simulator software 46b. The Eclipse simulator software 46b be executed by workstation processor 44d of FIG. 10. However, during the execution of the Eclipse simulator software 46b by the workstation processor 44d of FIG. 10, the Eclipse simulator software 46b will receive and utilize the data files associated with the raw data 50 of FIG. 12 and/or the data files generated by the pre-processor programs 52 of FIG. 12; and, during that execution of the Eclipse simulator software 46b, in response to these aforementioned data files, the Eclipse simulator software 46b will be generating a "set of simulation results". That "set of simulation results" will be passed back from the Eclipse simulator software 46b to the Eclipse Office software 46c. When the Eclipse Office software 46c receives that "set of simulation results", the Eclipse Office software 46c will be re-transmitting that "set of simulation results" to the "recorder or display or 3D viewer" 44e of FIGS. 10 through 12 for displaying and/or recording that "set of simulation results" on the 3D viewer 44e at each instantaneous point in time. Bear in mind that the "set of simulation results" will be generated from the Eclipse simulator software 46b during its execution by the workstation processor 44d, and that "set of simulation results" will be instantaneously displayed, by the Eclipse Office software 46c at each point in time, on the "recorder or display or 3D viewer" 44e of FIG. 12. As a result, the Eclipse Office software 46c will instantaneously "display or report results" 44e1 in response to the raw data files 50 and/or in response to the data files provided by the pre-processor programs 52, both during and after the execution of the Eclipse simulator software 46b by the workstation processor 44d. Refer now to FIG. 13 for a more complete description of this functional operation.

In FIG. 13, the Eclipse Office software 46c of FIGS. 10 through 12 includes a case/project manager 46c1, a case builder/data manager 46c2, a run manager 46c3, and a results file 46c4. The "display or report results" 44e1 generated on the "recorder or display or 3D viewer" 44e1 of FIGS. 11 and 12 includes a results viewer 1A and a report generator 1B. In FIG. 13, in response to an "output" generated from the run manager 46c3 (where said "output" consists of a plurality of data files, possibly including a plurality of 'test data' files compiled by the case manager 46c1, intended to be used by the Eclipse simulator software 46b during its execution), the Eclipse simulator software 46b will be executed by the workstation processor 44d of FIG. 10 and, responsive to that execution, the Eclipse simulator software 46b of FIG. 13 will generate a "set of simulation results". That "set of simulation results" will be stored in the "results file" 46c4 of the Eclipse office software 46c. That "set of simulation results" stored in the results file 46c4 will be read by the results viewer 1A and the report generator 1B of FIG. 13. As a consequence, the results viewer 1A will display a "set of results" and the report generator 1B will report or record that "set of results" on the "recorder or display or 3D viewer" 44e of FIGS. 10 through 12.

The functions provided by the case manager 46c1, the case builder 46c2, the run manager 46c3, and the results files 46c4 in addition to the results viewer 1A and the report generator 1B, will become evident in the following paragraphs with reference to FIGS. 14 through 17 of the drawings.

Figure 14:
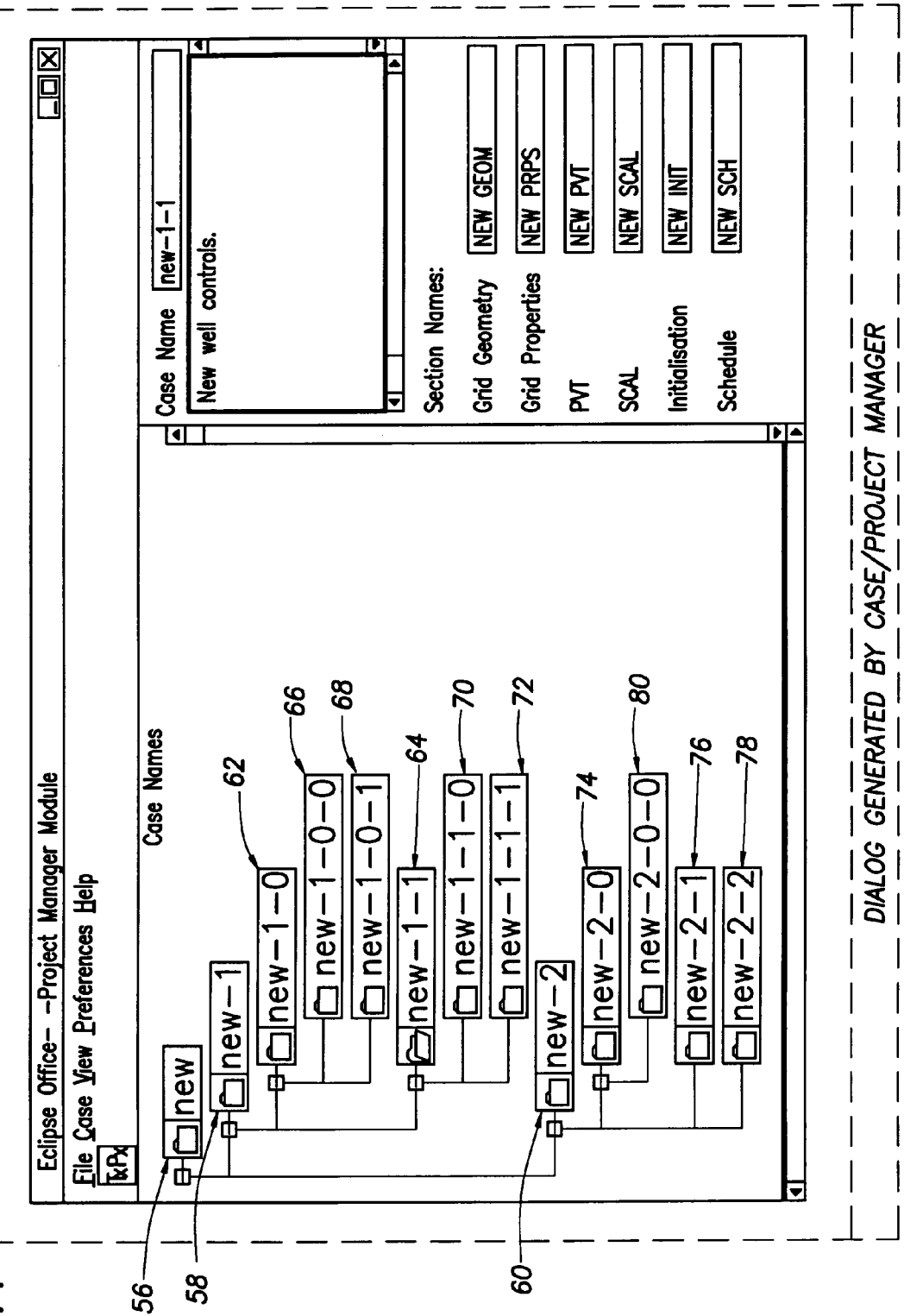
FIG. 14 illustrates how the "case/project manager" of FIG. 13 of the present invention (of the Eclipse Office software) structures the storage therein of the various subsets of test data, the test data being stored in the case manager in a 'tree like fashion' which allows an operator to select various types and sub-types of the test data.

In FIG. 14, a dialog or screen display, which is produced on the "recorder or display or 3D viewer" 44e of FIG. 10 by the case/project manager 46c1 of FIG. 13, is illustrated. This screen display depicts the manner by which the case/project manager 46c1 structures the storage therein of the various data files or "case scenarios" that are used by the simulator software 46b. In FIG. 14, the screen display which is generated by the case/project manager 46c1 of FIG. 13 consists of a plurality of "test data files" or "case scenarios" arranged in a "tree-like structure". For example, in FIG. 14, one test data file is called "new" 56. The "new" test data file 56 can be divided into two sub-parts: a first subpart test data file "new-1" 58 and a second subpart test data file "new-2" 60, the "new-1" 58 and the "new-2" 60 data files being two different supersets of the "new" 56 data file. The first subpart/test data file "new-1" 58 is subdivided into two further test data files: "new-1-0" 62 and "new-1-1" 64, each being a different superset of the "new-1" 58 data file. The "new-1-0" test data file 62 can be subdivided into two further sub-parts/data files: a "new-1-0-0" test data file 66 and a "new-1-0-1" test data file 68, each being a different superset of the "new-1-0" 62 data file. The other subparts/data files are also subdivided in a similar manner; for example, the "new-1-1" subpart/data file 64 is divided into two further data files: the "new-1-1-0" subpart/data file 70 and the "new-1-1-1" subpart/data file 72, each being a different superset of the "new-1-1" 64 data file. The "new-2" subpart/data file 60 is divided into three other subparts/data files: the "new-2-0" 74 data file, the "new-2-1" 76 data file, and the "new-2-2" 78 data file, each being a different superset of the "new-2" data file 60; and the subpart/data file "new-2-0" 74 is itself subdivided into yet another subpart/data file: the "new-2-0-0" 80 which is a superset of the "new-2-0" 74 data file.

In accordance with one major aspect of the present invention, the subdivisions of "test data files" or "case scenarios" illustrated in the case/project manager 46c1 screen display of FIG. 14 indicate that the case/project manager 46c1 of FIG. 13 stores therein a "plurality of test data files" or "case scenarios", and those test data files/case scenarios are subdivided into further subdivisions of test data files, and those further subdivisions of test data files can be subdivided into yet further subdivisions of test data files. In other words, the "plurality of test data files" stored in the case/project manager 46c1 of FIGS. 13 and 14 are stored in the case/project manager 46c1 in the form of a particular structure that can only be described as a "tree like structure". The operator sitting at the workstation 44 of FIG. 10 can select one or more subparts or subdivisions of those "test data files" 56 through 80 of FIG. 14 as desired, the selected subparts of subdivisions of data files being used by the Eclipse simulator software 46b, during the execution of the Eclipse simulator software 46b, to generate the results file 46c4 of FIG. 13. For example, in FIG. 14, the operator at workstation 44 can select the "new" data file 56; or the operator can select the "new-1" data file 58; or the operator can select the "new-2" data file 60; or the operator can select the "new-2-0-0" data file 80, etc. The function performed by the case/project manager 46c1 (in storing the test data files therein in the form of a "tree like structure" and enabling the operator to select various sets and supersets of the stored test data files for use by the simulator software 46b) will become more evident from a reading of the following description of the Eclipse Office software 46c of the present invention.

Figure 15:
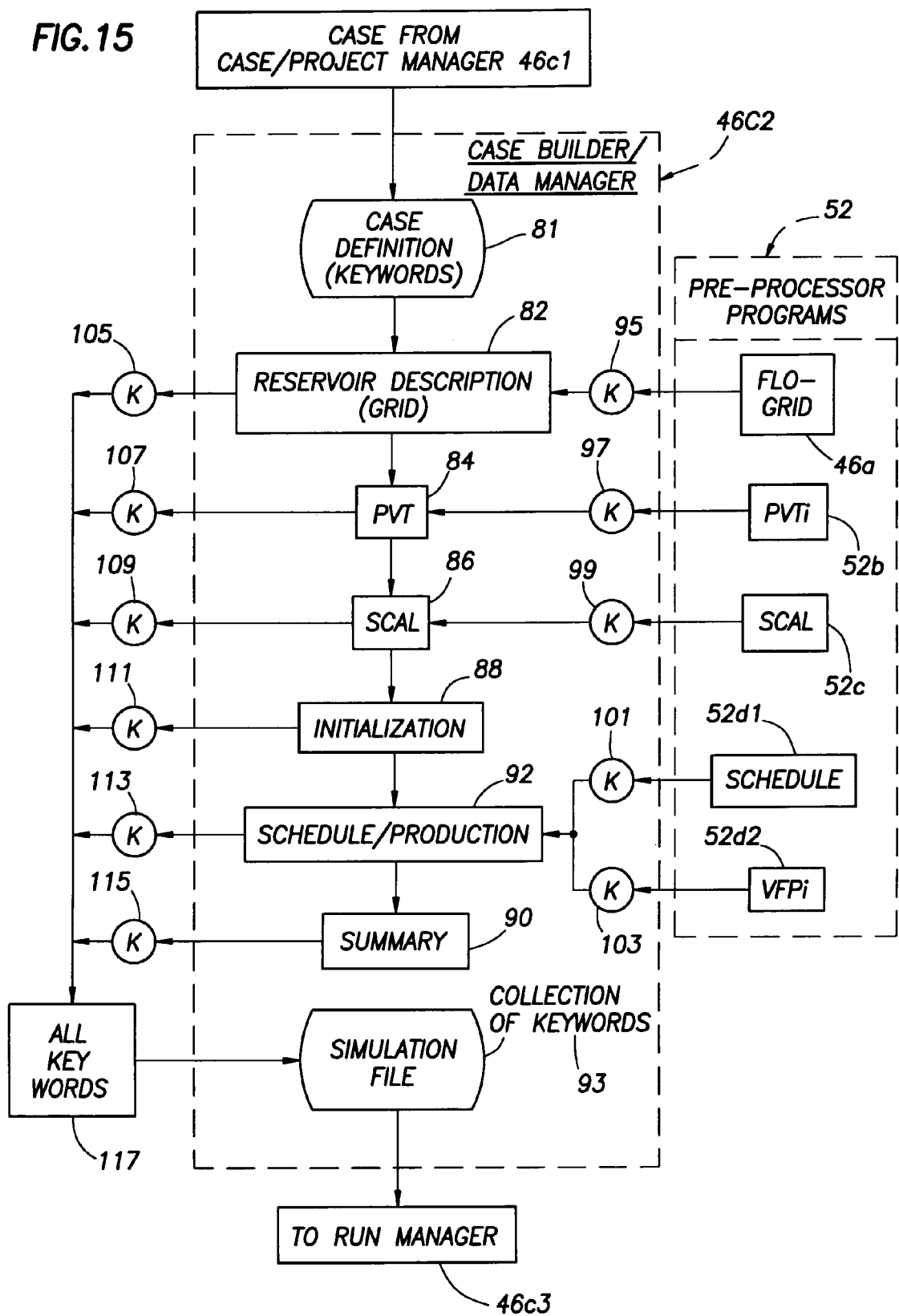
FIG. 15 illustrates a flowchart or block diagram illustrating the construction and/or functional operation of the "case builder/data manager" of FIG. 13 which is part of the Eclipse Office software of the present invention.

In FIG. 15, a functional block diagram of the case builder/data manager 46c2 of FIG. 13 is illustrated. The case builder/data manager 46c2 includes a reservoir description 82 consisting of a storage medium supplied with keywords ("K") originating from either the "case definition" 81 or the Flogrid preprocessor program 46a, a PVT storage medium 84 consisting of keywords (K) supplied by the PVTi preprocessor program 52b, a SCAL storage medium 86 consisting of keywords (K) supplied by the SCAL preprocessor program 52c, an "Initialization" block 88, a Schedule/Production storage medium 92 supplied with keywords (K) originating from the Schedule 52d1 and the VFPi 52d2 preprocessor programs 52d, a "Summary" block 90, and a "Simulation file" block 93 consisting of a collection of keywords (K). The Summary block 90 contains keywords which identify which vectors the operator wants to be output by the Eclipse simulator software 46b during the execution of the simulator. More particularly, the Summary block 90 allows the operator at workstation 44 to select one or more of a multitude of outputs or "vectors" generated from the Eclipse simulator software 46b; and this is significant since, when the one or more outputs or vectors from the simulator software 46b are selected, those particular selected outputs or vectors are stored in the Results file 46c4 of FIG. 13. The Initialization block 88 contains keywords which instruct exactly how to initialize the model. The case definition 81 consists of a collection of keywords (K) supplied by the case/project manager 46c1. Those keywords, initially stored in the case definition 81, are supplied to the various storage media 82, 84, 86, 88, 92, and 90. Keywords "K" 95, 97, 99, 101, and 103 are supplied, respectively, by the Flogrid 46a, PVTi 52b, SCAL 52, Schedule 52d1, and VFPi 52d2 pre-processor programs, and are transmitted to for storage in the Reservoir Description 82, the PVT 84, the SCAL 86, and the Schedule/Production 92 storage mediums. Keywords "K" are already stored in the "Initialization" 88 storage medium and the "Summary" 90 storage medium. In operation, in FIG. 15, the operator at workstation 44 of FIG. 10 can now edit the keywords "K" stored in any one or more of the following "particular storage media": Reservoir Description 82, PVT 84, SCAL 86, Initialization 88, Schedule/Production 92, and Summary 90. When the keywords "K" in the one or more of the "particular storage media" have been edited by the operator at workstation 44, a set of "newly edited keywords" (K) 105, 107, 109, 111, 113, and 115 are generated from the "particular storage media" and those "newly edited keywords" (as represented by "All Keywords" 117 in FIG. 15) are stored in the Simulation File 93 in FIG. 15. The "newly edited keywords" stored in the Simulation File 93 are now available to and are transmitted to the Run Manager 46c3.

Figure 16:
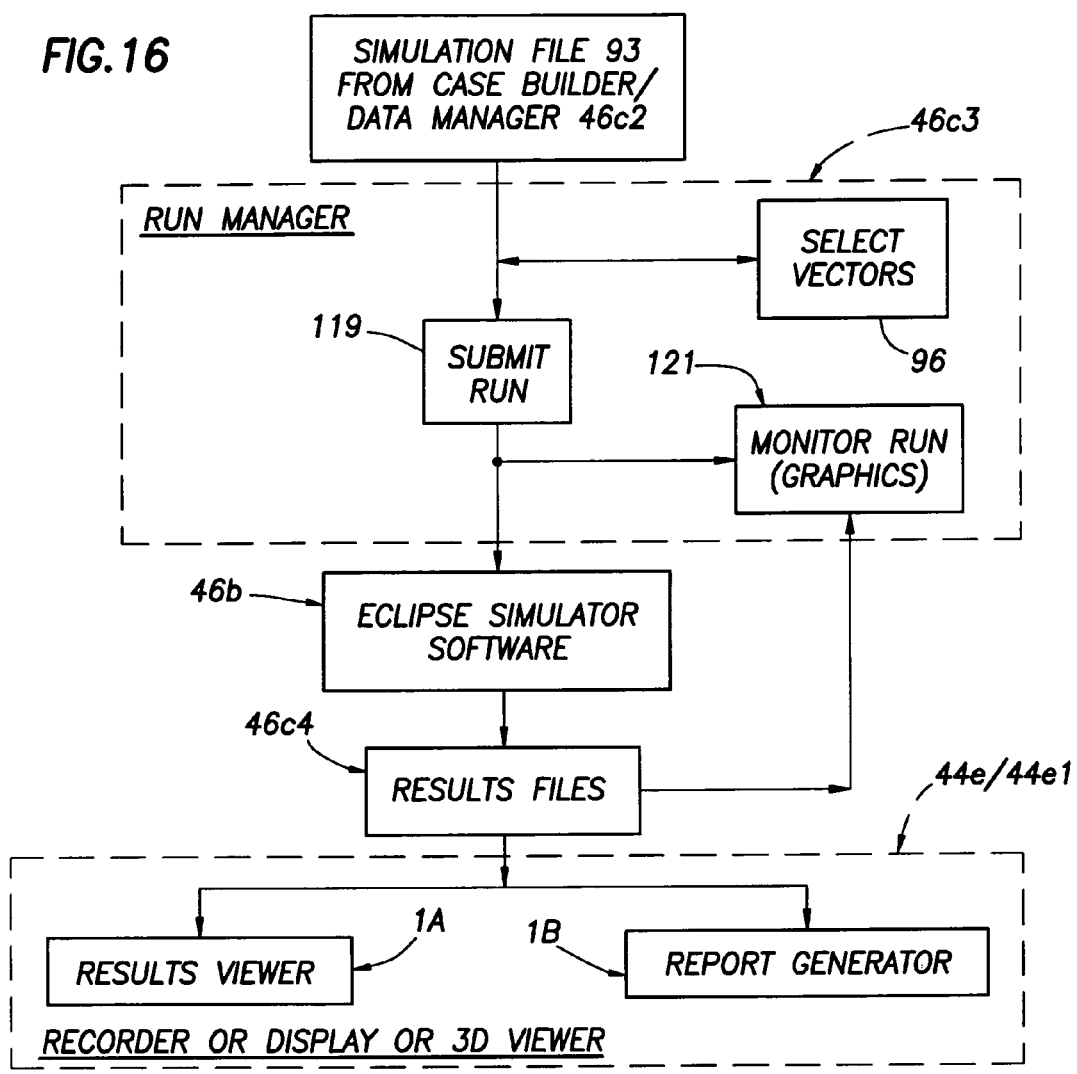
FIG. 16 illustrates a flowchart or block diagram illustrating the construction and/or a functional operation of the "run manager" of FIG. 13 which is part of the Eclipse Office software of the present invention.

In FIG. 16, a functional block diagram of the run manager 46c3 of FIG. 13 is illustrated. The run manager 46c3 can select vectors if applicable, block 96 of FIG. 16. If the simulation file 93 from the case builder 46c2 is too large, in order to avoid overloading memory, the run manager 46c3 can select certain vectors 96 associated with only a "subset of the simulation file" 93, and then the run manager 46c3 will "submit run" 119; that is, the run manager 46c3 will submit only that particular "subset of the simulation file" 93 (which was selected via the 'select vectors' 96) to the Eclipse simulator 46b for use by the simulator 46b during its execution by the workstation processor 44d of FIG. 10 (block 119 of FIG. 16). In addition, the run manager 46c3 will monitor the "run submitted to the simulator 46b" (see the "monitor run" block 121 in FIG. 16). As a result, in response to the receipt by the simulator 46b of only that particular "subset of the simulation file" 93, when the simulator 46b is executed, a "subset of results" will be generated from the simulator 46b, the "subset of results" corresponding to the particular "subset of the simulation file" 93. The "subset of results", corresponding to the particular "subset of the simulation file" 93, will be stored in the results file 46c4 of FIGS. 13 and 16. In FIG. 16, the "subset of results" stored in the results file 46c4 of FIG. 16 will be transmitted back to "monitor run" block 121. Now, the "monitor run" block 121 is receiving both the "run submitted to the simulator 46b" and the "subset of results" stored in the results file 46c4 thereby allowing the operator to compare the run being submitted by the case builder to the simulator 46b with the "subset of results" being generated by the simulator 46b. In addition, that "subset of results" stored in the results file 46c4 will also be displayed on the results viewer 1A of the "recorder or display or 3D viewer" 44e of FIG. 10 and/or the "subset of results" will be reported to the operator via the report generator 1B.

In any event, in FIG. 16, the simulation file 93, or the "subset of the simulation file" 93, will be submitted to the Eclipse simulator software 46b, block 119 in FIG. 16. During the execution of the Eclipse simulator software 46b by the workstation processor 44d, the simulation file 93 (or the "subset of the simulation file" 93) will be used by the simulator 46b, and, responsive to that execution of the simulator software 46b, a display will be produced on the "recorder or display or 3D viewer" 44e of FIG. 10, that display representing and corresponding to the test data in the "simulation file" 93, or to the test data in the "subset of the simulation file" 93. In FIG. 16, the run manager 46c3 will monitor (via the "monitor run" block 121 in FIG. 16) the "run submitted to the simulator 46b" and said "monitor run" block 121 will enable the operator to compare the run being submitted to the simulator with the set of simulation results being generated by the simulator. In addition, the results viewer 1A will instantaneously display the "subset of results" which are generated from the simulator 46b in response to the "run submitted to the simulator 46b".

Figure 17:
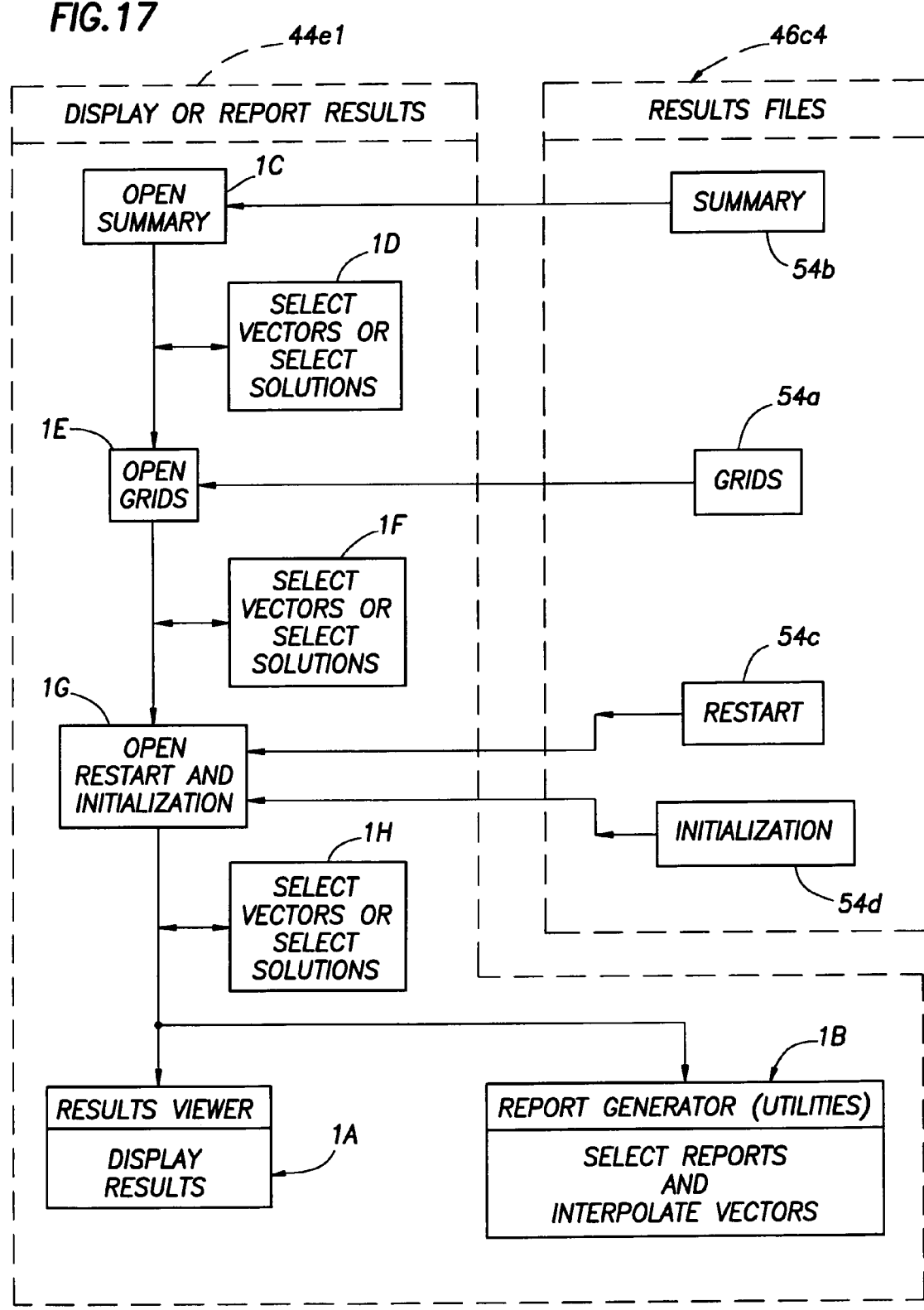
FIG. 17 illustrates a flowchart or block diagram illustrating a construction and/or a functional operation of the "results files" and the "display or report results" including the "results viewer" and the "report generator" of FIG. 13.

In FIG. 17, a functional block diagram of the "display or report results" 44e1 of FIG. 13 and of the "results file" 46c4 of FIG. 13 is illustrated. In FIG. 17, the results file 46c4 will include the following information: "simulation results" which pertain to grids 54a, a summary 54b, restart 54c, and initialization 54d. In FIG. 17, the "display or report results" 44e1 includes the results viewer 1A and the report generator 1B of FIG. 13. However, in addition, the "display or report results" 44e1 of FIG. 17 will also "open the summary" 1C (that is, it will open the summary 54b results file 46c4), "select vectors or solutions" 1D (which will select certain of the summary information 54b), "open grids" 1E (that is, open the "grids" 54a results file), "select vectors or select solutions" 1F (which will select certain of the grids information 54a), "open restart and initialization" 1G (that is, open the restart 54c and the initialization 54d results files), and "select vectors or select solutions" 1H (which will select certain of the restart and initialization information 54c and 54d), prior to displaying the selected summary information 1C and the selected grids information 1E and the selected restart and initialization information 1G on the results viewer 1A and/or reporting that same information on the report generator 1B. As a result, in FIG. 17, when the summary results file 54b is opened by the open summary block 1C, and the grids results file 54a is opened by open grid block 1E, and the restart results file 54c and the initialization results file 54d are opened by the open restart and initialization block 1G of FIG. 17, all the selected "simulation results" stored in the results files 46c4 of FIG. 17 will be made available to the results viewer 1A (which will display those "simulation results"), and all the selected "simulation results" stored in the results files 46c4 will be made available to the report generator 1B (which will select reports and solutions and interpolate vectors and generate a written report for management that will document those "simulation results").

A functional description of the operation of the Eclipse Office software 46c of FIG. 10 of the present invention, and, in particular, the case/project manager software 46c1 of FIG. 13 of the Eclipse Office software 46c of the present invention, will be set forth in the following paragraphs with reference to FIGS. 10 through 17 of the drawings.

In FIG. 10, a program storage device, such as the CD-Rom 46, has stored thereon the Flogrid software 46a, the Eclipse office software 46c, and the Eclipse simulator software 46b. That CD-Rom 46 is inserted into the workstation 44 of FIG. 10, and the Flogrid software 46a, the Eclipse office software 46c, and the Eclipse simulator software 46b are loaded from the CD-Rom 46 for storage into the workstation memory 44a of the workstation 44 of FIG. 10. When the Flogrid, Eclipse simulator, and Eclipse Office software are stored in the workstation memory 44a, one configuration of that software stored in memory 44a is illustrated in FIG. 12. In FIG. 12, certain "raw data" 50 is provided to the Eclipse Office software 46c. In addition, certain other input data, provided by the preprocessor programs 52 of FIG. 12, are also provided to the Eclipse Office software 46c. In FIG. 13, that raw data 50 and the other input data from the preprocessor programs 52 are provided as "input data" to the case builder/data manager 46c2 of FIG. 13.

However, in addition to the input "raw data" 50 and the other input data originating from the preprocessor programs 52 (which are all being made available to the case builder 46c2 of FIG. 13), the case/project manager 46c1 of FIG. 13, in accordance with one major aspect of the present invention, also contains a plurality of additional "test data files" which can also be made available to the case builder/data manager 46c2. Those additional "test data files" are illustrated in FIG. 14. In FIG. 14, those additional "test data files" are stored in the case/project manager 46c1 in a "tree-like" fashion. That is, those "test data files" are stored in the case/project manager 46c1 of FIG. 13 in the form of a "tree". For example, the broadest category of the test data files or "case scenarios" stored in the case/project manager 46c1 is the "new" 56 test data file of FIG. 14. However, if the user/operator wants to select certain other supersets of that "new" 56 test data file, the operator would then select either the "new-1" 58 superset test data file, or the "new-2" 60 superset test data file. On the other hand, if the operator wants to select still other supersets of the "new-1" 58 superset test data file or the "new-2" 60 superset test data file, the operator can select any one or more of the following supersets of the superset test data files 58 or 60: supersets 62, 64, 66, 68, 70, 72 for the superset test data file 58, and supersets 74, 76, 78, or 80 for the superset test data file 60 of FIG. 14. Each superset of the test data files of the case manager 46c1 of FIG. 14 contains certain unique parameters which are useful only when running the Eclipse simulator software 46b. As a result, the operator sitting at the workstation 44 of FIG. 10 may want to select one or more of the supersets of test data files 56 through 80 in FIG. 14 in order to study the resulting "results" stored in the results files 46c4 of FIG. 13 which are generated when the selected one or more supersets of test data files 56 through 80 are used by the simulator 46b. The operator can study those "results", stored in the results files 46c4, by viewing those "results" on the results viewer 1A of FIG. 13 or reading a report of those results on a report generated by the report generator 1B of FIG. 13.

In any event, in FIG. 13, if the raw data 50 is received by the case builder 46c2, the case builder 46c2 will allow the operator to edit that raw data 50, and the case builder 46c2 of FIG. 13 will present the edited raw data to the run manager 46c3 for submission of that edited raw data to the Eclipse simulator 46b. On the other hand, if the keyword data from the preprocessor programs 52 are received by the case builder 46c2, the case builder 46c2 will allow the operator to edit the preprocessor program 52 keyword data, and the edited preprocessor program keyword data will be submitted by the case builder 46c2 to the run manager 46c3 for submission of that data to the Eclipse simulator 46b. However, if the operator selects one or more of the sets or supersets of the test data files 56 through 80 in the case manager 46c1 of FIG. 14, the one or more selected sets or supersets of test data files in the case manager 46c1 (one or more of 56-80) will be submitted by the case manager 46c1 to the case builder 46c2 of FIG. 13, and the case builder 46c2 will allow the operator sitting at the workstation 44 to edit those test data files. The resulting edited test data files will be submitted by the case builder 46c2 to the run manager 46c3 for submission of the edited test data files to the Eclipse simulator 46b.

In FIG. 15, the case builder 46c2 will receive a case definition 81, consisting of a collection of keywords, from the case manager 46c1 of FIG. 13. Recall that the case definition 81 contains a collection of keywords representing the one or more sets or supersets of test data files that were selected by the operator via one or more of the "sets" or "supersets" of data files stored in the case manager "tree like structure" of FIG. 14. The case definition 81 keywords are made available to the various storage media 82, 84, 86, 88, 92, and 90 in FIG. 15. In addition, the keywords 95, 97, 99, 101, and 103 from the pre-processor programs 52 (and from the raw data 50) are also made available to the various storage media 82, 84, 86, and 92 in FIG. 15. The operator at the workstation 44 of FIG. 10 can now edit, as desired, the keywords stored in the various storage media 82, 84, 86, 88, 92, and 90 in FIG. 15. As a result, when this editing operation performed by the operator is complete, a set or collection of "edited keywords" 117 of FIG. 15 (keywords 105 through 115) are stored in the simulation file 93 of FIG. 15. These "edited keywords" 117 of FIG. 15, stored in the simulation file 93, now represent a set of "edited test data files" which will be submitted by the case builder 46c2 to the run manager 46c3.

The "edited test data files" will be submitted by the case builder 46c2 to the run manager 46c3. The run manager 46c3, in FIGS. 13 and 16, will submit the edited test data files to the Eclipse simulator 46b (see the "submit run" block 119 in FIG. 16), and the run manager 46c3 will monitor the "edited test data files" (see "monitor run" block 121 of FIG. 16). When the simulator 46b is executed in response to the "edited test data files", a set of "simulation results" will be generated from the simulator 46b, and those "simulation results" will be stored in the results file 46c4. Furthermore, those "simulation results" stored in the results files 46c4 will be made available to the results viewer 1A and/or the report generator 1B in FIG. 16. As a result, the "simulation results" will be displayed on the results viewer 1A of the "recorder or display or 3D viewer" 44e of FIGS. 10 and 13, and the "simulation results" can be recorded on a report via the report generator 1B. However, in FIG. 16, in addition, the "simulation results" stored in the results files 46c4 will be transmitted back from the results files 46c4 to the "monitor run" block 121 of the run manager 46c3. Since the "monitor run" block 121 is already monitoring the "edited test data files" being submitted by the case builder 46c2 to the simulator 46b, the operator at workstation 44 of FIG. 10 is able to visually compare, via the 'monitor run' block 121 of the run manager 46c3, the "edited test data files" (or case scenarios) being submitted to the simulator 46b with the "simulation results" being generated from the simulator 46b. At this point, as a result of the aforementioned visual comparison being performed by the run manager 46c3, the operator can now select other test data files or case scenarios stored in the case manager 46c1 thereby sending these other case scenarios to the case builder 46c2 for editing and submitting the edited other case scenarios from the case builder 46c2 to the simulator 46b.

In FIG. 13, when either the edited raw data 50, or the edited preprocessor program data 52, or the edited test data (56-80) are submitted to the Eclipse simulator software 46b, and when the Eclipse simulator software 46b is executed by the workstation processor 44d in response to that data, the Eclipse simulator software 46b will generate a set of "results files" 46c4 in FIG. 13. Those "results files" 46c4 will be made available to the results viewer 1A (of the display 44e of FIG. 10) and to the report generator 1B (of the recorder 44e of FIG. 10). The operator sitting at the workstation 44 can view those results on the display 44e via the results viewer 1A, or he can read a report of those results, which report is generated by the report generator 1B. In actual practice, in FIG. 17, the "display or report results" 44e1 will open the summary results file 54b, open the grids results file 54a, open the restart results file 54c, and open the initialization results file 54d. At this point, all the set of "simulation results" files which are stored in the "results file" 46c4 will be opened, and these "simulation results" are made available to the results viewer 1A, and to the report generator 1B. As a result, during the execution of the Eclipse simulator software 46b in FIG. 13, certain "simulation results" will be stored in the results files 46c4, and those "simulation results" will instantaneously be made available for viewing by the operator at workstation 44 by instantaneously displaying those "simulation results" in the results files 46c4 on the results viewer 1A, and instantaneously reporting those "simulation results" in the results files 46c4 on a written report which is generated via the report generator 1B.

A more detailed description of the structure and the functional operation of the Eclipse Office software 46c of FIG. 13 of the present invention will be set forth in the following "Eclipse Office software 46c Functional Specification" with reference to FIGS. 18 through 31 of the drawings.

Eclipse Office Software 46c Functional Specification

Refer now to FIGS. 18 through 31.

As a result of advances in technology over the last few years, the reservoir engineer must manage more data and make better informed decisions in a shorter period of time. That technology has enabled more data to be incorporated, more complex models to be built, and more realizations to be studied. However, as a further result, more data must be managed, more models must be created, and more results must be analyzed. The Eclipse Office software 46c of FIG. 10 provides the tools which allows the reservoir engineer to efficiently manage these tasks and thus concentrate on the engineering input and analysis. Consequently, the Eclipse Office software 46c will allow the reservoir engineer to create his model quickly, manage his data efficiently, and control his run effectively. The Eclipse Office software 46c: (1) allows for the import of raw data required for a simulation, (2) contains a suite of base level tools allowing the creation and manipulation of engineering data required for a simulation, and (3) provides a means for using more advanced tools within external packages to manipulate the data. Therefore, the Eclipse Office software 46c will provide an environment for all simulation related tasks (create/view/edit/manage data, view/analyze results, control/submit runs, and generate reports). Furthermore, the Eclipse Office product software 46c removes the need for manual editing of data, removes the need for macros to run individual programs, it is intuitive for a novice user, and it is complete for the experienced user.

1.0 Introduction

The Eclipse Office software 46c of FIG. 10 will provide the user with an environment within which engineering analysis can be conducted. These analyses will initially be focused on numerical simulation; however, the Eclipse Office software 46c design allows other engineering techniques to be used should new modules be developed. The following paragraphs will set forth both the engineering requirements and the specifications of the Eclipse Office software 46c, and establish its relationships to other products.

User Profile

The Eclipse Office software 46c of FIGS. 10 through 13 will become the preferred method of performing simulation related activities, and it will be an environment within which it will be possible to easily and efficiently conduct the full range of reservoir engineering tasks.

The expected users of the Eclipse Office software 46c will be petroleum engineers. The end users must have knowledge of the process of simulation, since the natural flow of the Eclipse Office product will follow this process.

2.0 Requirements

Major limitations restricting the growth of reservoir simulation are in its ease of use, level of required experience, and quantity of input data. These impact the market in different ways but all reinforce the idea that simulation is difficult and time consuming. In addition, reservoir engineering analysis (such as decline curve, material balance, or simple network analysis) are often conducted using spreadsheets, and yet the raw data for these are the same as the raw data for simulation. While the Eclipse Office software 46c is a self contained product, in terms of its data generation and analysis tools, it requires a knowledge of the system in which it is installed, and the availability of other software products, especially the simulator engines. The main work path through the Eclipse Office product software 46c is illustrated in FIG. 18.

Figure 18:
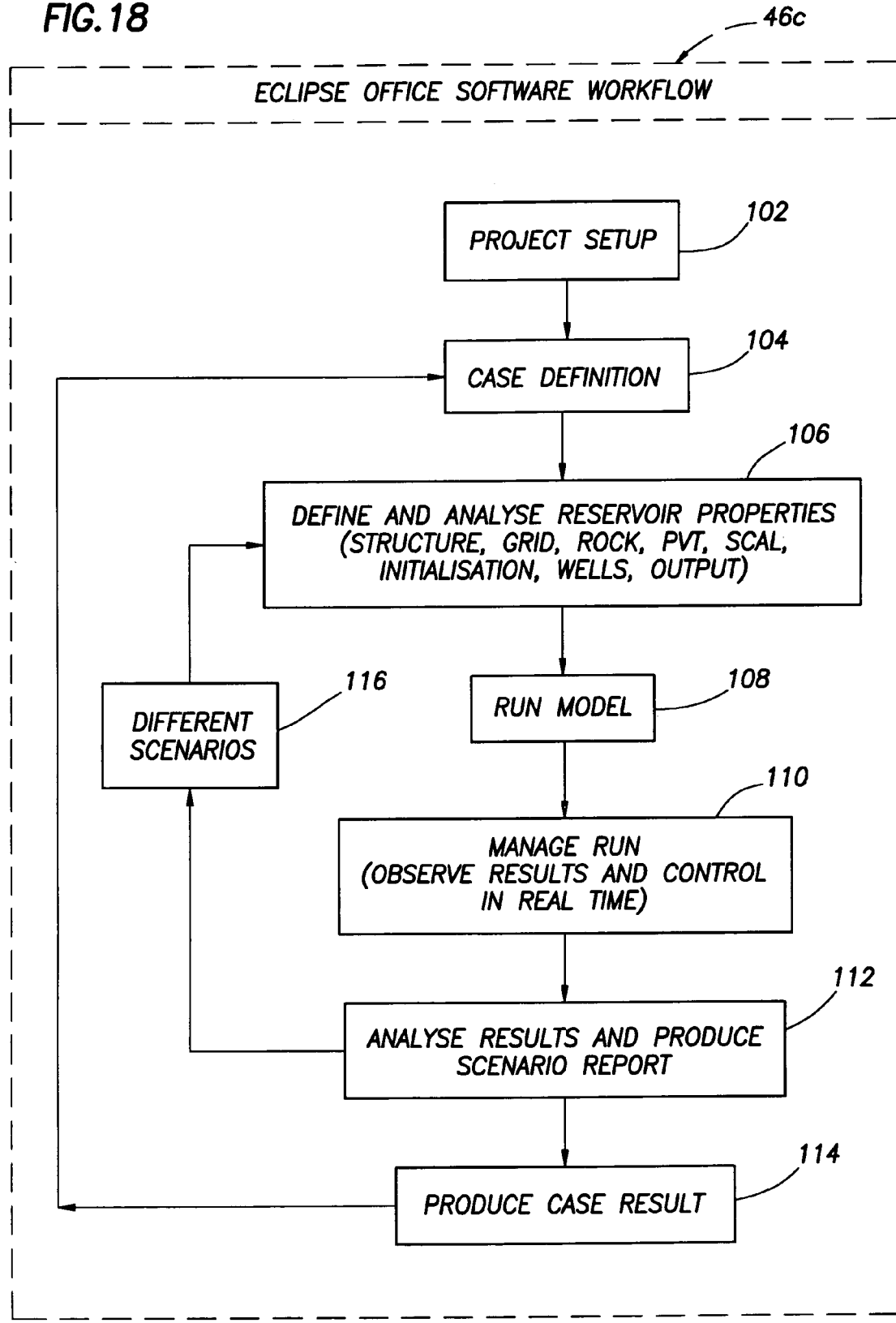
FIG. 18 illustrates a workflow or functional block diagram of the operation of the Eclipse Office software of the present invention, of FIG. 11.

Referring to FIG. 18, the Eclipse Office software 46c workflow or functional block diagram is illustrated. In FIG. 18, the Eclipse Office software 46c workflow starts with project setup, 102, followed by case definition, 104. The next step involves defining and analyzing reservoir properties, 106. The model is run, 108. The operator will now manage the run, 110, analyze the results and produce a scenario report, 112, and produce a case report 114. When analyzing the results and producing the scenario report (112), different scenarios 116 can be selected (see case/project manager 46c1 in FIG. 13) and steps 106 through 112 can be repeated.

The Eclipse Office software 46c concept provides three main functions: (1) it provides a structured, easy to use means to generate numerical reservoir models quickly, (2) it manages input and output data, and (3) it executes existing pre and post processors. The integration of existing, other software products into the Eclipse Office environment allows those other products to provide their fully advanced functionality in a seamless fashion. The construction of a simulation grid, for example, can be achieved simply with the tools available in Eclipse Office, however, more advanced and complex geological models could be constructed by called Grid and Flogrid as submodules.

Functional Requirements

It is essential that base functionality is both simple to use and robust. The Eclipse Office product software 46c will be used across the hardware range from PC's to UNIX workstations, and therefore it should not require high end graphics performance. The Eclipse Office software 46c should be as memory efficient as possible, ideally being able to run on a minimum configuration of a 486/66 PC with 20 Mb of RAM.

Data Management

The Eclipse Office software 46c of FIGS. 10 through 13 is capable of doing the following:

1. read existing Eclipse simulator software 46b simulation decks and determine relevant sections,
2. keep a record of all data dependencies between scenarios and prevent conflicting situations from ruining the simulation, 3. validate individual data sections to ensure all options selected have all relevant data specified,
4. support data communication to/from the simulator engines,
5. support data communication to/from Flogrid (recall that the "Flogrid gridding software" is disclosed in prior pending U.S. patent application Ser. No. 09/034,701, filed in the U.S. on Mar. 4, 1998, which is based on a Great Britain patent application number 9727288.4 filed Dec. 24, 1997, the disclosure of which has already been incorporated by reference into this specification),
6. support data communication to/from the PVTi preprocessor program 52b of FIG. 12,
7. support data communication to/from the Schedule preprocessor program 52d1 of FIG. 12, and
8. support data communication to/from the SCAL preprocessor program 52c of FIG. 12.

Reservoir Description 82 of FIG. 15

The Eclipse Office software 46c provides tools to allow for the generation of grid geometry and grid properties, including maps, faults, boundaries, wells, aquifers, layers, grid properties, simulation grid builder, and other general abilities. Each of these will be discussed in detail, as follows:

1. Maps
   (a) Import of maps (CPS-3, ZMAP+, ascii generic)
   (b) Ability to digitize contour maps (multi-contour and single point contour, e.g., porosity at well locations)
2. Faults
   (a) Importation of vertical fault traces (ascii generic)
   (b) Ability to digitize fault traces
   (c) Ability to edit fault trace
   (d) Ability to set variable transmissibility multipliers along fault length
3. Boundaries
   (a) Importation of reservoir boundaries (ascii generic)
   (b) Ability to digitize reservoir boundaries
   (c) Ability to edit reservoir boundary shape
4. Wells
   (a) Import of well locations (ascii generic)
   (b) Ability to digitize and edit well locations (vertical and horizontal)—supports manual entry of well coordinates
   (c) Ability to read and display deviated well tracks
5. Aquifers
   (a) Ability to attach aquifers as boundary conditions
   (b) Ability to define aquifer volume and properties
   (c) Ability to supply/enter aquifer influence tables
   (d) Ability to define aquifers as numerical or analytical
6. Layers
   (a) Ability to supply a single top or base map, and a thickness map for each layer
   (b) Ability to supply constant values across a reservoir layer (e.g., thickness, porosity, permeability, etc)
   (c) Ability to attach the same map to more than one layer
   (d) Ability to support a mixture of top/base maps with thickness maps to allow explicit shale modeling
7. Grid Properties
   (a) Ability to sample maps to set grid properties (real numbers)
   (b) Ability to sample map/property to set logical grid properties (integers—e.g. rock type)
   (c) Ability to supply (and store) mathematical correlation relating one property (e.g. porosity or depth) to another (e.g., permeability) and provide means of varying that based on a third (non-simulation) property (e.g., clay volume, or rock type)
   (d) Ability to globally or locally set kv/kh
   (e) Ability to provide local cell value modifiers in the form of multipliers (to be varied by scenario)
   (f) Ability to view, set, and edit properties on an areal or vertical region basis (e.g., constant porosity across this region) including those of a single cell either graphically or via a keyword editor
   (g) Ability to view grid properties on an areal or cross section viewer
   (h) Ability to contour, map and display derived grid properties (such as calculated hydrocarbon pore volume thickness) and save/copy these contours to a new map
   (i) Ability to read simulator output files an input
8. Simulation grid builder—support for the creation (and editing) of corner point geometry grids will be provided by Grid and Flogrid
   (a) Ability to generate multi-layer PEBI grids based on well locations, faults and reservoir boundaries
   (b) Ability to generate a fixed cell size (e.g., 200 m) grid within a given boundary
   (c) Ability to generate both 2D and 3D single well (radial) models
   (d) Ability to generate a cross sectional model
   (e) Ability to sub divide reservoir layers for simulation
   (f) Ability to generate local cartesian and radial grid refinements
   (g) Ability to enter flux boundary locations and generate the flux files from a base run and support new case generation utilizing those fluxes automatically
9. General
   (a) Ability to keep grid geometry separate from cell properties to allow different scenarios to be run on exactly the same grid
   (b) Ability to read existing block center and corner point grids for display
   (c) Ability to read existing grid properties for display and contouring purposes (only final values need be stored—e.g., in case when multiple edits have been made in existing data deck)
   (d) Ability to read and display existing LGR definitions (but not edit unless created in Eclipse Office initially)
   (e) Ability to call "Grid" (and ultimately "Flogrid") to build simulation grids and properties
   (f) Ability to read and display existing regional definitions (e.g., flux regions, rock type regions, etc)
   (g) Must write full grid geometry file, and initial properties file for post processing
   (h) Ability to view and edit engineering input (e.g., the map or correlation used to generate the property), keyword input (the simulator input), or graphically (color filled block display)
   (i) Ability to support user supplied include files (for third party applications)

Fluid Properties

PVT (see block 84 of FIG. 15)

The Eclipse Office software 46c of FIGS. 10 through 13 will:

1. provide correlations and simple equations of state to generate PVT properties for: water, dead oil, volatile oil (including multiple undersaturated curves), gas condensate, dry gas, and "n" component mixtures,
2. provide graphical, keyword and engineering (correlation panel) displays of these PVT properties; these should be a phase plot for compositional models and GOR/Bo/uo vs P for black oil (similarly for gas), 3. support the reading and editing of existing keyword files in keyword form, and store regional variations as specified,
4. support the calling of PVT/PVTi to generate PVT properties,
5. support the variation of PVT properties with depth (GOR/bubble point pressure, Bo, oil API, fluid composition) as well as regional variations
6. support the use of the underlying calculator to generate these properties should a user have a preferred correlation,
7. support passive phase tracers,
8. support active brine tracking, and the variation of water properties with salinity,
9. support non-isothermal and isothermal runs, including the variation of PVT properties with temperature, and
10. support the setting of the rate of gas resolution/gas vaporization.

SCAL (see block 86 in FIG. 15)

The Eclipse Office software 46c of FIGS. 10 through 13 will:
1. support generation of relative permeability curves through Corey exponents, including regional variation of end points and exponents,
2. support direct entry/file import of relative permeability curves, and regional variation,
3. accept and support normalized relative permeability and capillary pressure curves,
4. support J Functions for capillary pressure generation,
5. support use of end point variation vs depth and a function of other parameters (e.g. rock properties)[to denormalize curves], and
6. support the calling of the SCAL program for more detailed analysis.

Specification of Initial Contacts and Pressures

The Eclipse Office software 46c of FIGS. 10 through 13 will support three ways to specify initial conditions: (1) Equilibration, (2) Enumeration, and (3) Restart (Standard and SAE/LOAD). Each of these three ways, plus an additional general set of support conditions, will be discussed below, as follows:

Equilibration—The Eclipse Office software 46c of FIGS. 10 through 13 will:
1. support the entry of initial contact depths and reference pressure,
2. support the reading of an existing data file to set (and allow editing of) initial contact depths and reference pressures,
3. support regional variation of contacts and pressures,
4. support threshold pressures between regions/along faults to control flow between equilibration regions, and
5. support "enhanced" options, such as improved fluid in place calculations.

Enumeration—The Eclipse Office software 46c of FIGS. 10 through 13 will support the setting of all relevant arrays through one of the following means:
1. explicit setting—single value/cell through keyword editor or include file,
2. calculated setting—provision of pressure and saturation profile through use of calculator Restart—In FIG. 17, block 54c "Restart", the Eclipse Office software 46c of FIGS. 10 through 13 will support the restarting of a run (using the same grid) from its base run. Restart (54c) should be date or report step specified, and the user should see all available restart dates. The Eclipse Office software 46c must ensure that the Schedule section is in line with this date through use of the SKIPREST keyword.

General—The Eclipse Office software 46c of FIGS. 10 through 13:
1. will support the initialization of a simulation model for fluid in place determination,
2. could be extended to support general material balance analysis, and
3. could be extended to support RFT pressure analysis to compare and set regional variations in contacts and gradients.

Set Up of Well and Gathering Tree Information

General:

The Eclipse Office software 46c of FIGS. 10 through 13 will support the intuitive and easy to use interface of areal well locations, the ability to double click for item editing, and drag and drop (where appropriate). Editing can be facilitated by double clicking on a well (etc) or clicking with the right mouse button for a drop down menu. The Eclipse Office software 46c will support an easy method of setting controls for multiple wells/groups at a time. This could be achieved by rubber banding, CTRL-clicking, wildcarding or some other means. In addition, the Eclipse Office software 46c will call the VFPi preprocessor program (52d2 of FIGS. 12 and 15) to construct pipeline and well lift curves.

Wells:

The Eclipse Office software 46c of FIGS. 10 through 13 will:
1. support the reverse engineering of existing input decks to determine an approximate (x, y) location from the cell (i, j) and other interpretable information (rates, kinds, status, etc),
2. support vertical, deviated and horizontal wells, and determine the completed cells,
3. support the entry of well completed intervals based on depth or logical representations (e.g. oil leg, water leg, gas cap, layers 1-4, 9000-9500 ft)
4. call the Schedule preprocessor program 52d1 of FIG. 12 to handle complex analyses,
5. support the variation in time of:
   a) well rates and targets (oil, water, gas, liquid, bhp, thp),
   b) well controls (rate specified, pressure control etc),
   c) well kinds (injectors, producers),
   d) well status (open, close, queue for drilling),
   e) well downtime factors,
   f) well lift curve,
   g) completed interval properties (skin, kh, datum, depth, etc), and
   h) well workover parameters,
6. support one value per time/report step—it will not interpolate or average historical data, and
7. support the concept of drilling queues, and be able to 'spot' future wells on its areal display.

Groups:

The Eclipse Office software 46c of FIGS. 10 through 13 will:
1. support the flexible generation of well groups through:
   a) reading an existing data deck,
   b) graphically providing icons for group nodes and setting sons (wells of groups) through drag/drop—note: multiple sons can be specified by rubber banding, CTRL clicking, etc, to highlight a number of items before drag/drop, and
   c) graphically setting and highlighting (in different color) groups with no direct control mode,
2. support the variation in time of:
   a) group rates and targets (oil, water, gas and liquid),
   b) group controls (rate specified, potential/guiderate controlled, no control)

c) group controls (production/injection targets, voidage replacement, re-injection)

3. support the import of fluids of a different composition/phase for re-injection/top-up,
4. support the definition of a separator train and its conditions,
5. support the setting up of gas field sales contracts, and
6. support the concept of 'equipment':
   a) gas plants,
   b) well head chokes,
   c) satellite injection/production, and
   d) compressor/pumps and their fluid consumption (note: equipment may be placed at any node in the group hierarchy).

Networks:

The Eclipse Office software 46c of FIGS. 10 through 13 will:
1. support the definition of line properties and the attachment of VFP tables to network branches,
2. support the setting of group nodes as manifolds (common pressure points), and
3. support the setting of fixed pressure nodes.

Output Controls

In general, the role of the ASCII print file should be de-emphasized. All tabular output should be able to be generated from the graphics/restart files. The Eclipse Office software 46c will generate a standard list of output which will ensure the standard engineering analyses can be conducted. Specifically, this list needs to contain: (1) field, group and well rates (oil, water, gas, liquid), (2) field, group and well pressures (field datum average pressure, node pressures well bhp, thp if setup), (3) field, group and well cumulatives, and (4) cell pressures (datum corrected) and phase saturations.

The Eclipse Office software 46c will support the selection features by topic and automatically generate a list of applicable (optional) output for this run—e.g., if tracers are present in the run, then automatically select all tracer outputs, but allow user to disable those if required. This list should also contain simulator performance vectors. In addition, the Eclipse Office software 46c will support panel selection for grid based properties. These should be written to graphics files for subsequent viewing graphically or in a tabular form.

Multiple Scenarios

Once enabled, the multiple scenario option should simply present the end user with a list of variables that can be "scenarioised" (i.e., made into scenarios). Individual scenarios are then created simply by changing the relevant section to reflect the ranges of that parameter to be used.

The Eclipse Office software 46c will support the ability to "scenarioise" the following parameters: (1) fault multipliers, (2) grid properties (including correlation parameters—to allow support for calculator generated properties), (3) grid cell size (for regular Cartesian grids), (4) relative permeability curves (Corey exponents and table end points), (5) initial contact depths, (6) initial pressures, (7) aquifer parameters (size, strength), (8) PVT correlation parameters, (9) well targets and limits (rates and pressures), (10) group targets, (11) drilling queues, and (12) well workover parameters (water cut/GOR limits, etc).

The Eclipse Office software 46c will support the use of different include files for each scenario—note: this will allow support of external products to setup multiple scenarios (e.g. PVT or GRID). The Eclipse Office software 46c will keep track of these scenarios and allow submission of all or a particular grouping automatically.

Job Submission and Control

The Eclipse Office software 46c of FIGS. 10 through 13:
1. will support both local and remote platforms for execution of simulation jobs,
2. will allow jobs to be queued (internally) so that memory is efficiently used,
3. will allow job prioritization (e.g. small quick jobs should be able to jump in front—both interactively and in batch)
4. will allow viewing of current jobs, the job queue, and job status,
5. should support an underlying queue structure where installed,
6. will support multiple scenarios to be singly submitted and queued,
7. will support an option of interactive results viewing with all of the functionality of the results viewing module,
8. will allow interactive simulator control with the following options:
   a) abort run
   b) pause run
   c) advance to next report step, write restart (optional) and stop Viewing and Analysis of Results This module must be available while a simulation model is proceeding. The viewing and analysis of results needs to be highly intuitive—extensive use should be made of mouse clicks to obtain point/cell values or to set particular attributes (e.g. line or axis attributes).

The Eclipse Office software 46c of FIGS. 10 through 13 will:
1. support a number of standard plot types (e.g. well phase rates vs time, well bhp vs time). These standard plot types should then be available for wells/groups/etc at the click of a mouse button; the default x axis needs to be calendar years,
2. support the user configuration of the standard plot types, including defining additional ones,
3. support the plotting of user entered/supplied data along with simulation results,
4. support the creation of user vectors/solutions through the underlying calculator,
5. support 2D areal and cross section solution views that can be stepped through time both manually and automatically; interactive interrogation of cell values should be supported on both views,
6. support color filled contouring of results
7. support the clicking of well/group/platform to plot its rate history (these plots should be user definable),
8. call GRAF for more flexible and batch plotting options; the Eclipse Office software 46c will create the relevant GRF for loading the data automatically into GRAF,
9. support generation of tabular based output currently written in fixed form to the ASCII print file; specifically, the generation of Fluid in Place and well reports need to be supported,
10. support the generation of monthly/quarterly/annual averages of rate data—note: this could be via the Schedule preprocessor program,
11. support viewing of cell based data either graphically or in its tabular matrix form,
12. support the analysis of multiple scenarios through parameterization,
13. support curve fitting/regression for experimental design,
14. support a flexible means (wildcard/rubber banding/CTRL clicking) to gather data to line plot—note: an option here should be the ability to sum these data items together to produce a total pot for the flexible group, and 15. support an easy to use means of selecting variables to plot—this should not just be a list of mnemonics.

Report Generation

The Eclipse Office software 46c of FIGS. 10 through 13 will:

1. provide a series of pre-defined report templates,
2. generate formatted input to a spreadsheet for economic analysis,
3. support calculator scripts to conduct analysis not directly supported, and
4. generate reports on: (1) scenario basis, (2) case basis—comparing scenarios and giving spread, (3) project basis—comparing anything.

Walkthroughs

The following two examples are presented which will demonstrate the usefulness of the Eclipse Office software 46c of FIGS. 10 through 13:

Case 1—New Model

A user is running on a networked personal computer.

First, define the project. This includes the title, directory, areal extent, and primary units system.

Second, create the case. This includes defining phases, and selecting treatment (isothermal, compositional, etc).

Third, define data. This includes:

1. building a reservoir model by: loading tops map, loading faults, entering layer properties, entering well locations and providing porosity values to generate poro map (interpolate and sample), generating x/y permeabilities through poro/perm correlation, and setting kv/kh,
2. setting fluid properties by PVT correlation,
3. setting relative permeability and capillary pressure data (Corey exponents and J function),
4. setting initial contacts and reference pressure, and
5. setting well data by: setting completed depths, targets and rate limits, spotting new wells that could be drilled, defining group/gathering structure, setting equipment limits/controls as field/separator level (injection capacities, separator limits, etc), and setting injection and reinjection controls.

Fourth, run the simulation model. Observe results, and decide that the run has fallen off plateaux rate too early, so kill the job. Modify existing scenario to add drilling queue. Re-run through to the end.

Fifth, plot and analyze the results. Generate plots of: field oil rate vs time, cumulative oil vs time, field oil rate vs cumulative oil, field pressure vs cumulative oil, and average well bhp over all producers against time and add field pressure to plot. Create a standard report including plots in relevant places.

Case 2—Existing Data Model

First, define the project. This includes title, directory, areal extent, and primary unites system.

Second, create the case—initialize all data.

Third, create a new multiple scenario. This includes the following:

1. change fault multipliers (defined using "Faults" keyword,
2. change PVT
3. change to black oil, through correlation, and plot against old PVT
4. add two new wells, set guiderates and pressure limits
5. change group limits to add new group
6. submit model to run for 10 years
7. analyze results
8. create new scenario
9. restart from 5 years, adding 2 new wells to an existing group
10. run model
11. plot results and compare last 5 years on both
12. add original compositional results by reading existing summary files
13. read user data file of measured well RFT pressure vs depth at time of 1 year, and compare to simulated response
14. save and quit project 3.0 Specifications The Eclipse Office Data Model In the Eclipse Office software 46c of FIGS. 10 through 13 data model, there will be a database to hold the structure of the project. The project is made up of a base case, which is a simulator input file. From the base case, many cases and scenarios can arise in a "tree like structure" (see FIG. 14). The cases and scenarios in the "tree like structure" of FIG. 14 are, in fact, simulator input files. For each case, the database will hold the following information:

1. case definition, and
2. Include filenames for each section of the simulator input.

Each section of the Case Builder/Data Manager 46c2 of FIG. 15 in the Eclipse Office software 46c will produce an Include file for the case (the grid geometry and the properties will be separate from the Include files). The Include files produced by the Eclipse Office software 46c contain additional information as comments, e.g., PVT correlation types, Temperature, Gas Gravity, etc. Although the user can save intermediate files as Include files, there is no method for tracking these, e.g., saving different PVT correlations.

Application Layout

Figure 19:
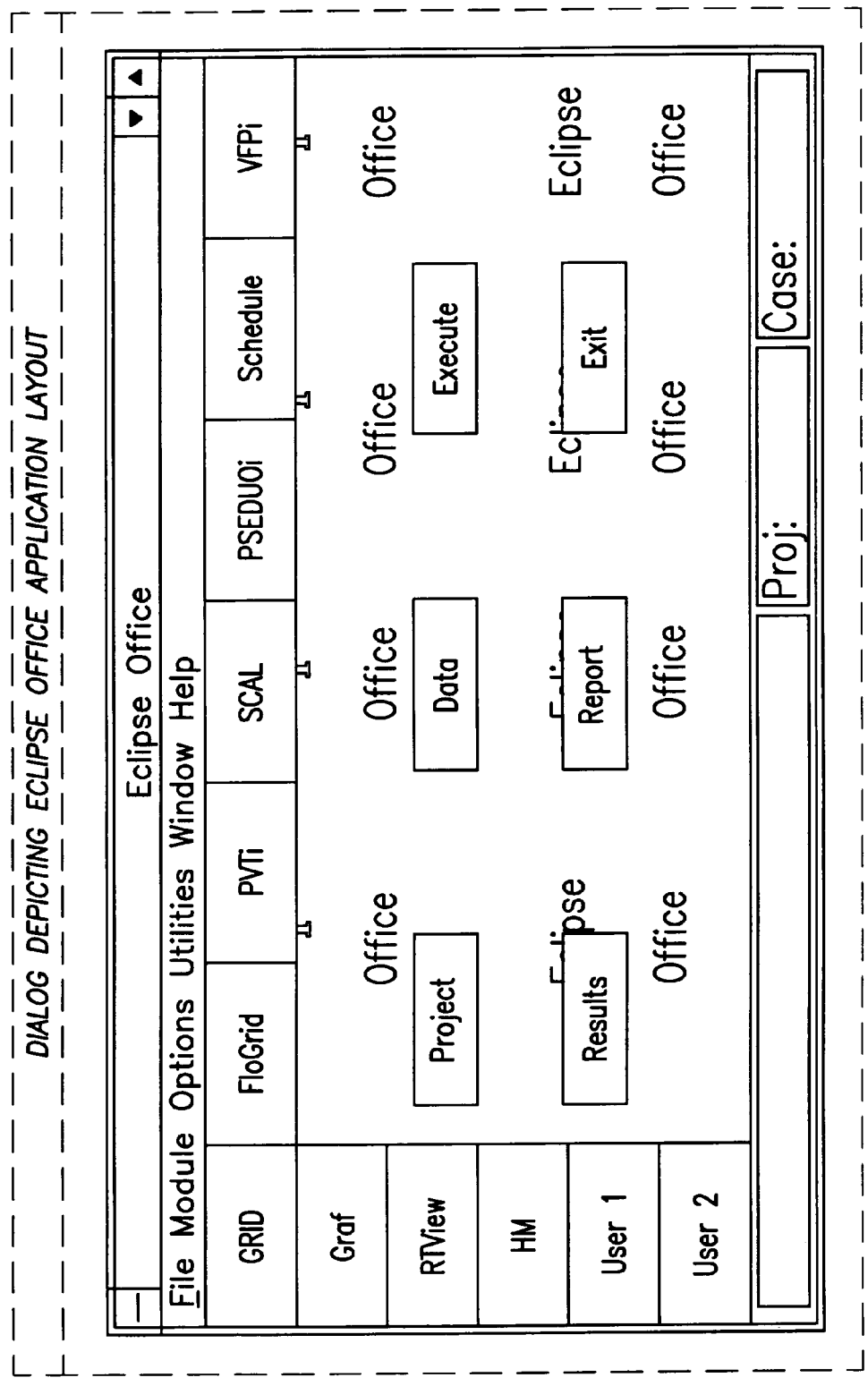
FIG. 19 illustrates a dialog depicting the Eclipse Office application layout.

Refer now to FIG. 19 for a dialog depicting the Eclipse Office software 46c application layout.

In FIG. 19, a screen display is illustrated, and the screen display of FIG. 19 is displayed on the "recorder or display or 3D viewer" 44e of FIGS. 10 through 13 upon start-up. There will also be a log window displayed. The main window of FIG. 19, however, consists of a menu bar, preprocessor push-buttons (Flogrid, PVTi, SCAL, Schedule, VFPi) and post processor push buttons (Graf, RTView, HM), and Eclipse Office software 46c modules displayed as push buttons (Project, Data, Execute, Results, Report, Exit).

Menu Bar Items—referring to the Application Layout of FIG. 19

File

1. Open—file dialog for database files
2. ASCII Read—file dialog for ascii database files
3. About—panel to show/enter project details
4. Save—saves current database file
5. Save As—file dialog to save new database file
6. ASCII Write—file dialog to save new ascii database file
7. close—closes current database
8. Exit—exits the program Module 1. Project
2. Data
3. Execute
4. Results
5. Report Options 1. Units—choice between oil field, metric, etc
2. Directories—panel
3. Configuration—submenu
   a) system—panel with network information
   b) software—panel with installed pre/post processor programs/versions c) simulator—panel with simulator options—note: the software and simulator options will come from decoding the Password with the Configuration file Utilities
1. About—displays panel with Eclipse Office details
2. Calculator—general calculator facility
3. Text Editor—general editing facility Window
1. Tile
2. Cascade
3. Minimise—general window facilities
4. Restore
5. Log Window Help
1. About—interactive on-line help system Pre/Post Processor Push Buttons
1. Pressing the button will launch the selected program Eclipse Office Software 46*c* Modules of the Application Layout of FIG. 19

Pressing the Eclipse Office module pushbuttons of FIG. 19 (i.e., the "Project" module pushbutton, the "Data" module pushbutton, the "Execute" module pushbutton, the "Results" module pushbutton, the "Report" module pushbutton, and the Exit module pushbutton in FIG. 19) will bring to the front the selected module. Let us now consider each of the Eclipse Office modules individually below.

"Project" Module of FIG. 19—the Case/Project Manager 46*c*1 of FIG. 13 and FIG. 14

Workflow

Figure 20:
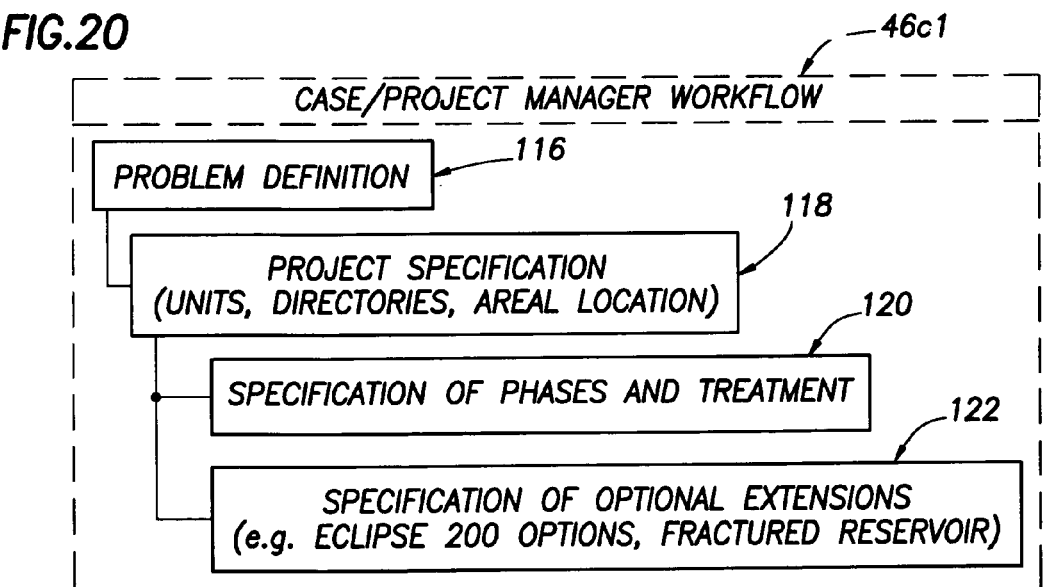
FIG. 20 illustrates a workflow or functional block diagram of the case/project manager of the Eclipse Office software of the present invention.

In FIG. 20, a workflow or functional block diagram associated with the Case/Project manager 46*c*1 of FIGS. 13 and 14 is illustrated. In FIG. 20, the functional block diagram of the Case manager 46*c*1 includes the following: (1) problem definition 116, (2) Project Specification (units, directories, areal location) 118, (3) Under Project specification, Specification of phases and treatment 120, and (4) Under Project Specification, specification of optional extensions 122.

Layout

Figure 21:
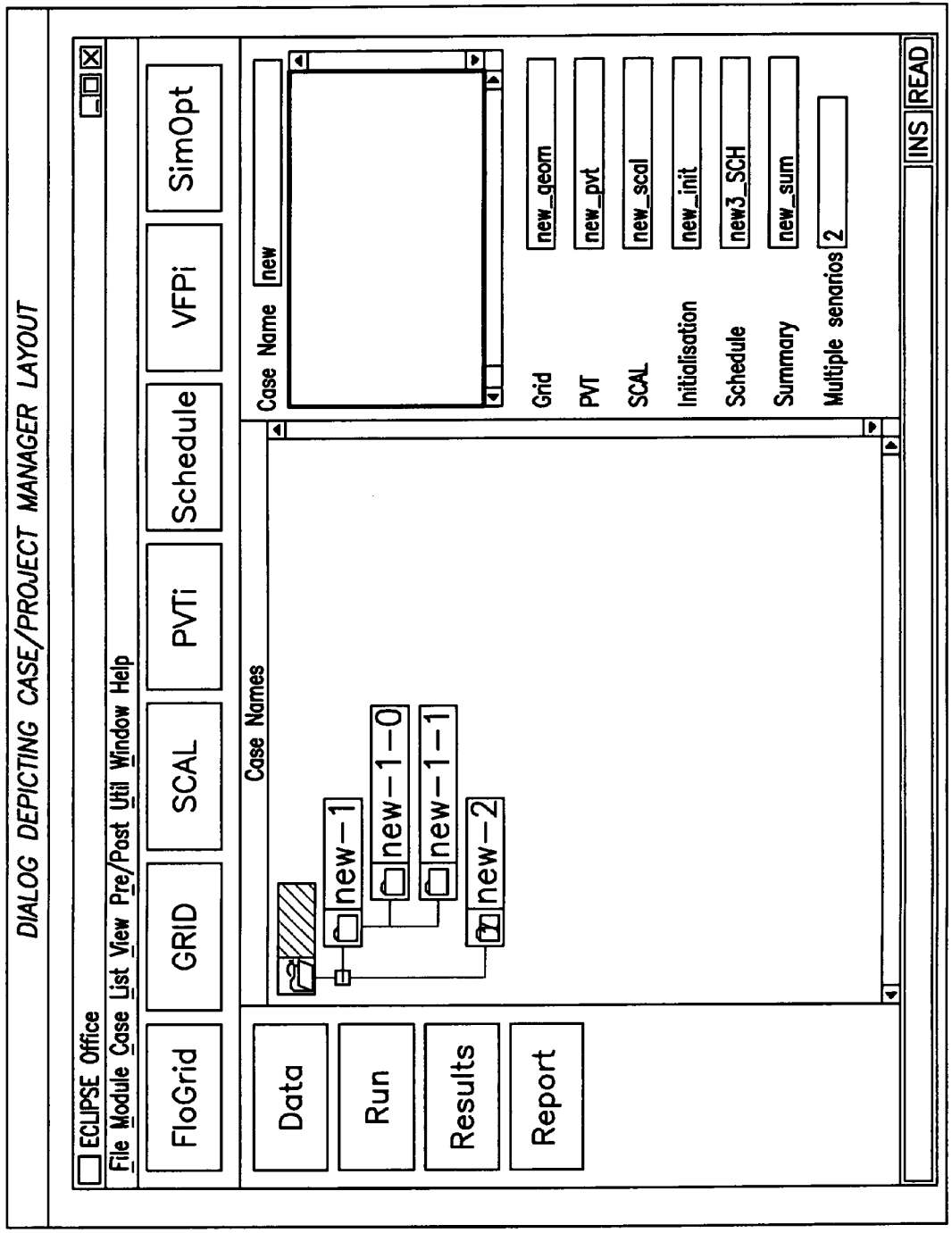
FIG. 21 illustrates a dialog depicting the case/project manager layout.

In FIG. 21, a dialog depicting the Case/Project manager 46*c*1 layout is illustrated. The Case/Project manager 46*c*1 layout (or "window screen display") consists of a Menu Bar, Icons, and the current Project displayed as a hierarchical "tree like structure". In FIG. 21, the screen display of FIG. 21 is displayed on the "recorder or display or 3D viewer" 44*e* of FIGS. 10 through 13 upon entry to the "Case/Project manager" if an existing project has been opened. The display area will be blank if the project is empty.

Nomenclature
1. Base—first simulator run of the current project
2. Case—any subsequent simulator run where the grid geometry has been changed from its parent
3. Scenario—any subsequent simulator run where the grid geometry remains the same as its parent Case and Scenarios will be color coded.

Menu Bar Items

File
1. Track—file dialog to select file and view history of file
2. Close—closes Project Manager module Case
1. About—panel to show/enter case details
2. View—views input and output files associated with selected case/scenario
3. Load—loads selected case/scenario
4. Load As—loads selected case/scenario as a new case/scenario
5. Create—creates a new case/scenario from an existing simulator run
6. Delete—removes selected case/scenario and all children from project Options
1. Base—will set the selected case/scenario as the Base case
2. Restart—displays restart tree if selected case/scenario is a restart run "Data" Module of the Application Layout of FIG. 19—the Case Builder/Data Manager 46*c*2 of FIGS. 13 and 15

Workflow

In FIGS. 22*a* and 22*b*, a workflow or functional block diagram associated with the Case Builder/Data manager 46*c*2 of FIGS. 13 and 15 is illustrated.

Refer now to FIG. 22*a* for the initial blocks of the functional block diagram of the Case Builder 46*c*2.
1. Define and Analyze Reservoir Properties—block 124
   a) Structure
      i) Boundaries—block 128
      ii) Structure Maps—block 128
      iii) Faults—block 128
      iv) Aquifer definition—block 128
   b) Geometry—block 130
      i) PEBI—block 132
      ii) Cartesian block gridder—block 132*a* of 132
         a) cross section generator—block 133
      iii) Radial Gridder—block 134
      iv) Detailed Gridder via Flogrid—block 134
   c) Rock Properties—block 136
      i) map sampling—block 138
      ii) correlation (e.g. poro/perm)—block 138
      iii) constant properties—block 138*a* of 138
         a) by layer—block 140
         b) by areal painter—block 140
   d) PVT—block 142
      i) correlation—block 144
      ii) Simple EoS—block 144
      iii) Detailed Analysis (via PVTi)—block 144
      iv) Direct Input—block 144
      v) Region Painter—block 144

Refer now to FIG. 22*b* for the remaining blocks of the functional block diagram of the Case Builder 46*c*2.
1. Define and Analyze Reservoir Properties—Block 146
   a) SCAL—block 148
      i) Corey Exponents—block 148
      ii) Detailed Analysis via SCAL—block 148
      iii) Direct Input—block 148
      iv) Region Painter—block 148
   b) Initialisation—Block 150
      i) Contacts and Static Pressure—block 150
      ii) Region Painter—block 150
         a) simple RFT pressure vs. Depth analysis
      iii) Calculated (Enumeration)—block 150
      iv) Material Balance Analysis—block 150
         a) STOOIP determination
      v) Restart from previous run—block 150
   c) Wells, Groups and Network—block 152
      i) Wells—block 152
         a) Detailed Analysis via Schedule
         b) Basic setup (as in PEBI)
         c) Decline curve analysis
      ii) Group and Network Setup—block 152
         a) Network hierarchy
         b) Lift curve analysis via VFPi
         c) Prediction generator d) Output—block 154
   i) Frequency
Layout Refer now to FIG. 23 which illustrates a dialog depicting the Case Builder/Data Manager (46c2 of FIGS. 13 and 15) layout.

In FIG. 23, the Case Builder/Data Manager (46c2 of FIGS. 13 and 15) window or screen display consists of a menu bar, preprocessor push buttons, icons and a display of the current model (case/scenario) representing the model area together with the wells. This will be blank if a new project.

Menu Bar Items in FIG. 23
File
1. Close—closes Data Manager module
Section
1. Define
2. Description
3. PVT
4. SCAL—opens the selected section
5. Initialization
6. Schedule
7. Output
Modules Case Definition—the case definition section consists of "Menu Bar Items" and "Folder Items" specifying the simulator, model type, phases and other options
   a) Menu Bar Items
      i) File
         a) Close—closes case definition section
   b) Folder Items
      i) General
         a) Simulator—Black Oil, Compositional or Thermal
         b) Start Date
         c) Title
         d) Model Type—3D, X-section, Radial, 1-D
         e) Run type—Restart, load/Save
      ii) Phases
         a) Oil, Water, Gas, dissolved Gas, Vaporized Oil, Gas-Wat
      iii) Options
         a) Tracers, Temp, API, Dual Poro, Miscible
      iv) Solution
         a) Impes, Fully Implicit, AIM, IMPSAT Reservoir Description 82 of FIG. 15

Figure 24:
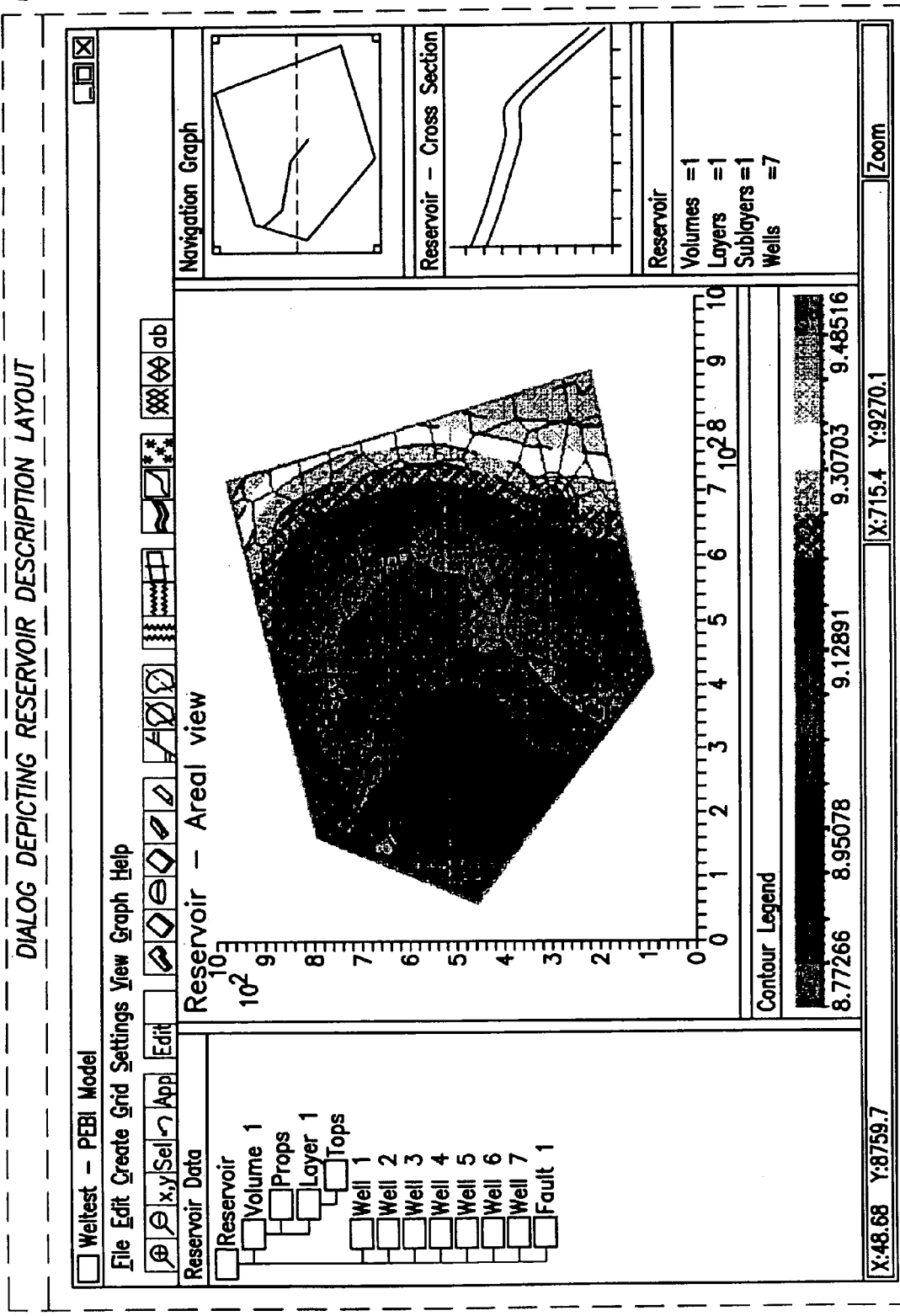
FIG. 24 illustrates a dialog depicting a reservoir description layout.

Refer now to FIG. 24 which illustrates a dialog depicting the Reservoir Description (82) layout. The Reservoir Description 82 is shown in FIG. 15.

Additional options will include:
1. import and display of corner point and block centered geometry
2. simple gridding options, e.g., x meter spaced grid
3. re-gridding of corner point model to PEBI grid
4. aquifer support PVT 84 of FIG. 15

Figure 25:
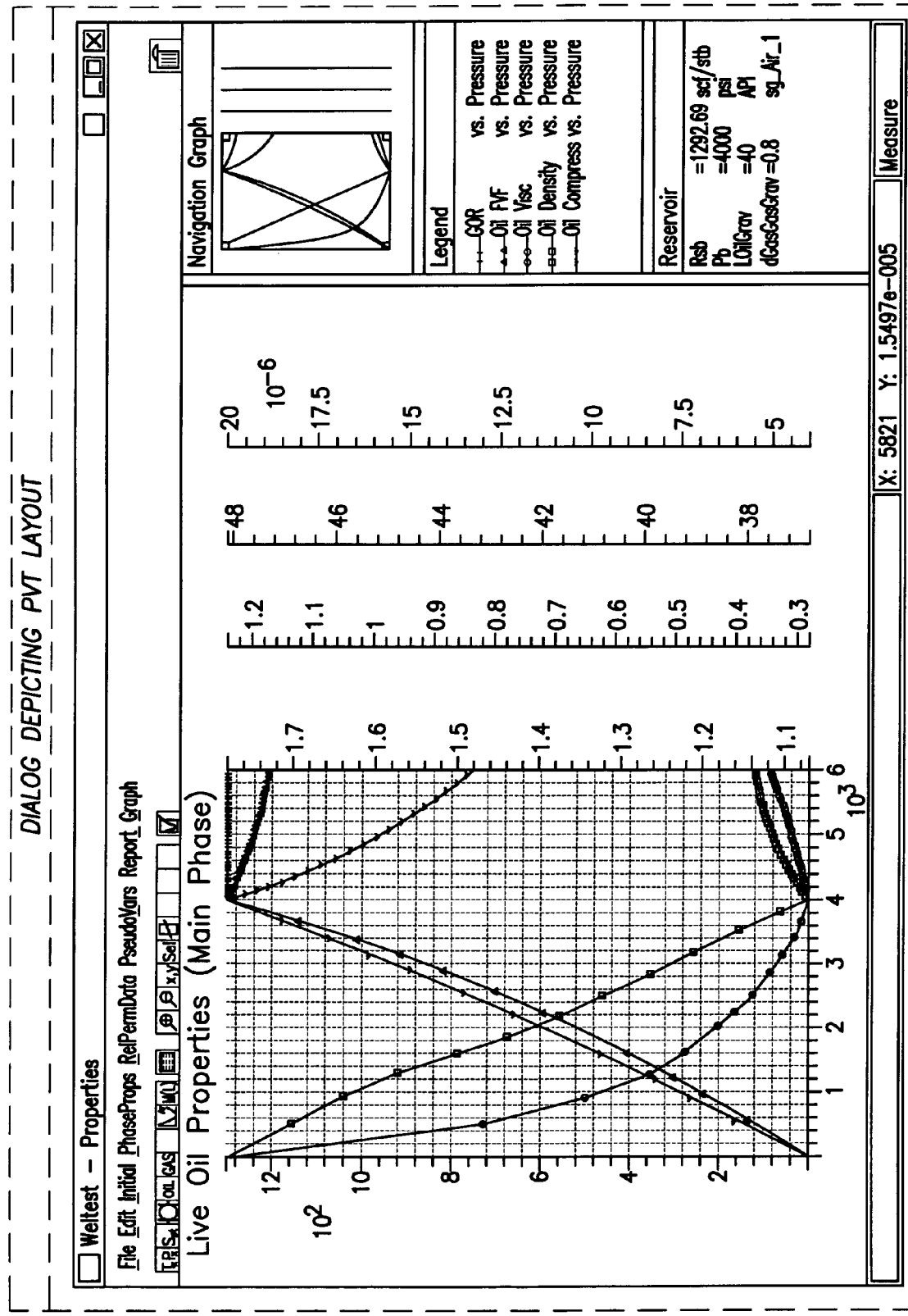
FIG. 25 illustrates a dialog depicting a PVT layout.

Refer now to FIG. 25 which illustrates a dialog depicting the PVT (84) layout. The PVT storage medium 84 is shown in FIG. 15.

Additional options (not shown in FIG. 25) will include:
1. import of PVT data from existing dataset
2. support for more than one PVT region
3. compositional and thermal keywords
4. region painter
Menu Bar Items
File
1. close—closes PVT section
2. Import—reads PVT data from existing dataset
3. PVTi—runs PVTi
4. Save—saves as an Include file
View
1. Plot—plots data
2. Keywords—displays keywords
3. Correlation—displays correlation inputs and plots
Region
1. Add—adds a new region
2. Edit—edits regions
3. Delete—deletes a region SCAL 86 of FIG. 15

Figure 26:
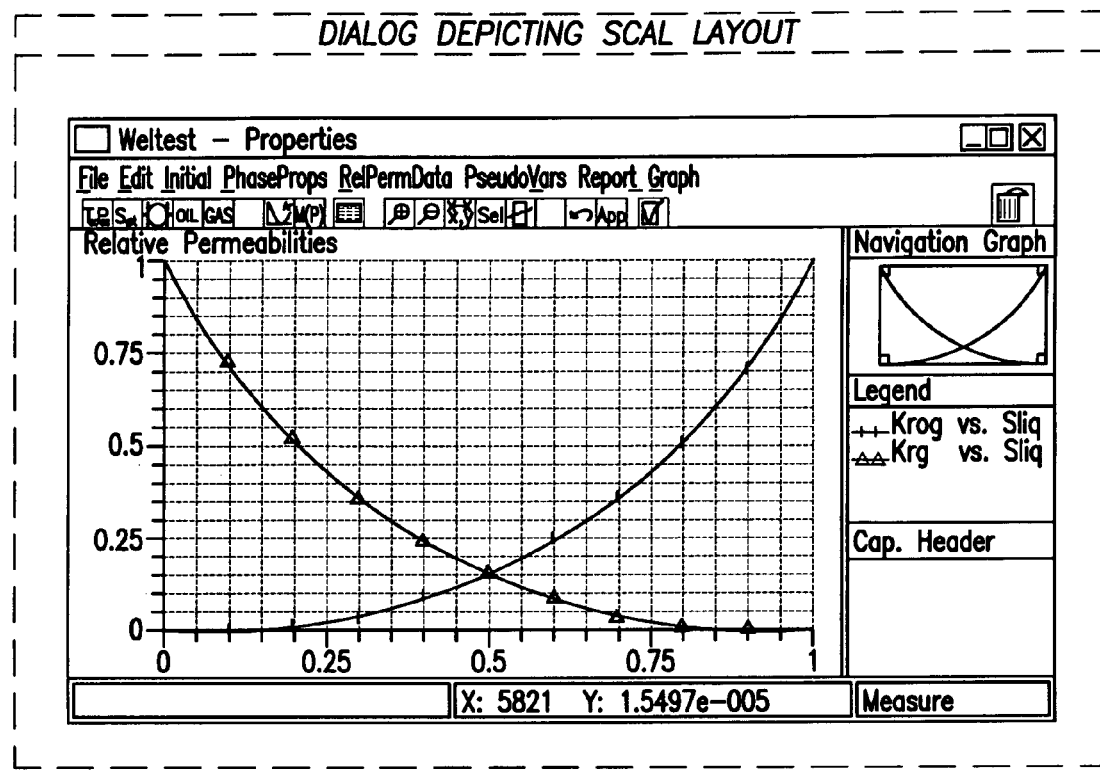
FIG. 26 illustrates a dialog depicting a SCAL layout.

Refer now to FIG. 26 which illustrates a dialog depicting the SCAL (86) layout. The SCAL storage medium 86 is shown in FIG. 15.

Additional options (not shown in FIG. 26) will include:
1. import of SCAL data from existing dataset
2. support for more than one SCAL region
3. three phase relative permeability correlation
4. region painter
Menu Bar Items
File
1. Close—closes SCAL section
2. Import—reads SCAL data from existing dataset
3. SCAL—runs SCAL program
4. Save—saves as Include file
View
1. Plot—plots data
2. Keywords—displays keywords
3. Correlation—displays correlation input and plots
Region
1. Add—adds a new region
2. Edit—Edits regions
3. Delete—deletes a region Initialization 88 of FIG. 15

Initialization—The Initialization section consists of a Menu Bar and Icons.
Menu Bar Items
File
1. Close—closes initialization section
2. Import—reads initialization data from existing dataset
3. Save—saves as Include file
Method
1. Equilibration
2. Enumeration
3. Restart
Restart This will display a panel of the saved restart numbers and dates from which the user can select the appropriate one.

Enumeration

This will display a window allowing input of initial values.
Menu Bar Items
File
1. Close—closes window
Options
1. Plot—plots data
Equilibration This will display a window for contact depth input
Menu Bar Items
File
1. close—close window
Options
1. Plot—plots data
2. keywords—displays keywords Schedule/Production Database 92 of FIG. 15

Figure 27:
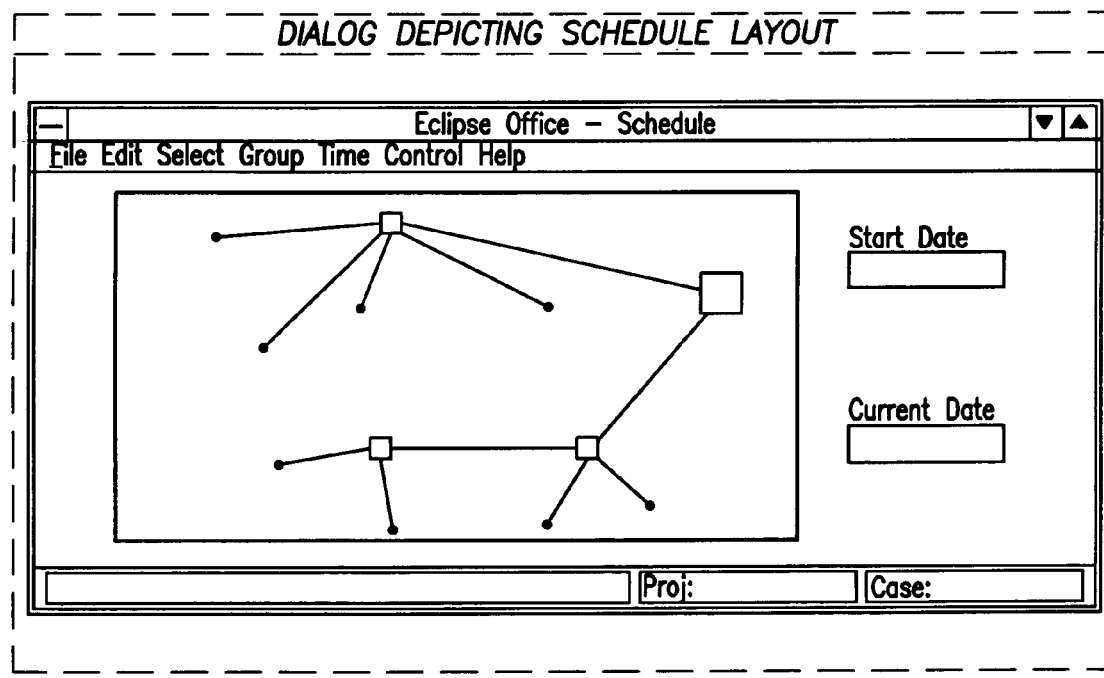
FIG. 27 illustrates a dialog depicting a Schedule layout.

Refer now to FIG. 27 which illustrates a dialog depicting the Schedule database (92) layout. The Schedule/Production storage medium 92 is shown in FIG. 15.

The Schedule window of FIG. 27 consists of a Menu Bar, Icons, and a display of the current model (case/scenario) representing the model area together with the wells and their group hierarchy.

Menu Bar Items
File
1. Close—closes Schedule module
2. Schedule—runs Schedule program
3. VFPi—runs VFPi program
4. Save—saves as Include file
Edit
1. Well
2. Group—selects appropriate item and displays
3. Network—panel for entry/view of data
Group
1. Define—defines new group
Time
1. Event times—defines event times
Control
1. tuning—sets tuning control for whole run
2. Timestep—defines timesteps
Output The output window consists of a Menu Bar and Icons. The main display area is blank.

Menu Bar Items
File
1. Close—closes output section
2. Import—import from existing dataset
3. Save—saves as Include file
Vector
1. Field
2. Well
3. Group—selects appropriate item for output
4. Regions
Multiple Scenarios The multiple scenarios window consists of a Menu Bar and Icons. The main display area is blank. This section will allow the user to easily specify a number of realizations to be run on this case/scenario. These realizations will be specified in an engineering terminology, e.g., poro/perm relationship, well rates, different PVT data, etc. This will ensure that the Grid Geometry of the model cannot be changed and therefore the runs can be compared.

Run Manager 46c3 of FIG. 13 and FIG. 16

Figure 28:
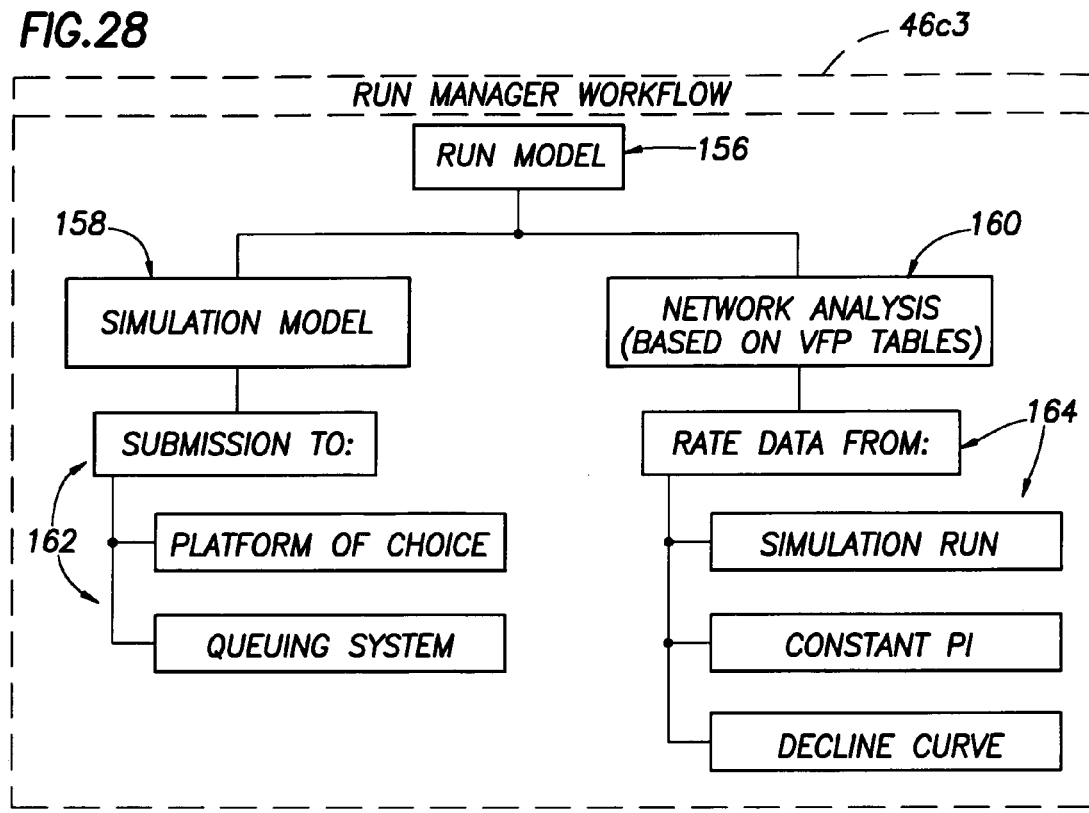
FIG. 28 illustrates a workflow or functional block diagram of the run manager of the Eclipse office software of the present invention.

Refer now to FIG. 28 which illustrates a workflow or functional block diagram illustrating the function of the Run Manager 46c3 of FIGS. 13 and 16.

The functional block diagram of the Run Manager 46c3, which is shown in FIG. 28, is duplicated below as follows:

Run Model—block 156
1. Simulation Model—block 158
    (a) Submission to:
        i) platform of choice—block 162
        ii) Queuing System—block 162
2. Network Analysis (based on VFP tables)—block 160
    a) rate data from:
        i) simulation run—block 164
        ii) constant Pl—block 164
        iii) decline curve—block 164
Layout The "Janus" program will form the basis of the Run Manager 46c3 within the Eclipse Office software 46c. Currently, "Janus" submits, controls and monitors multiple simulator runs through the PVM interface.

Figure 29:
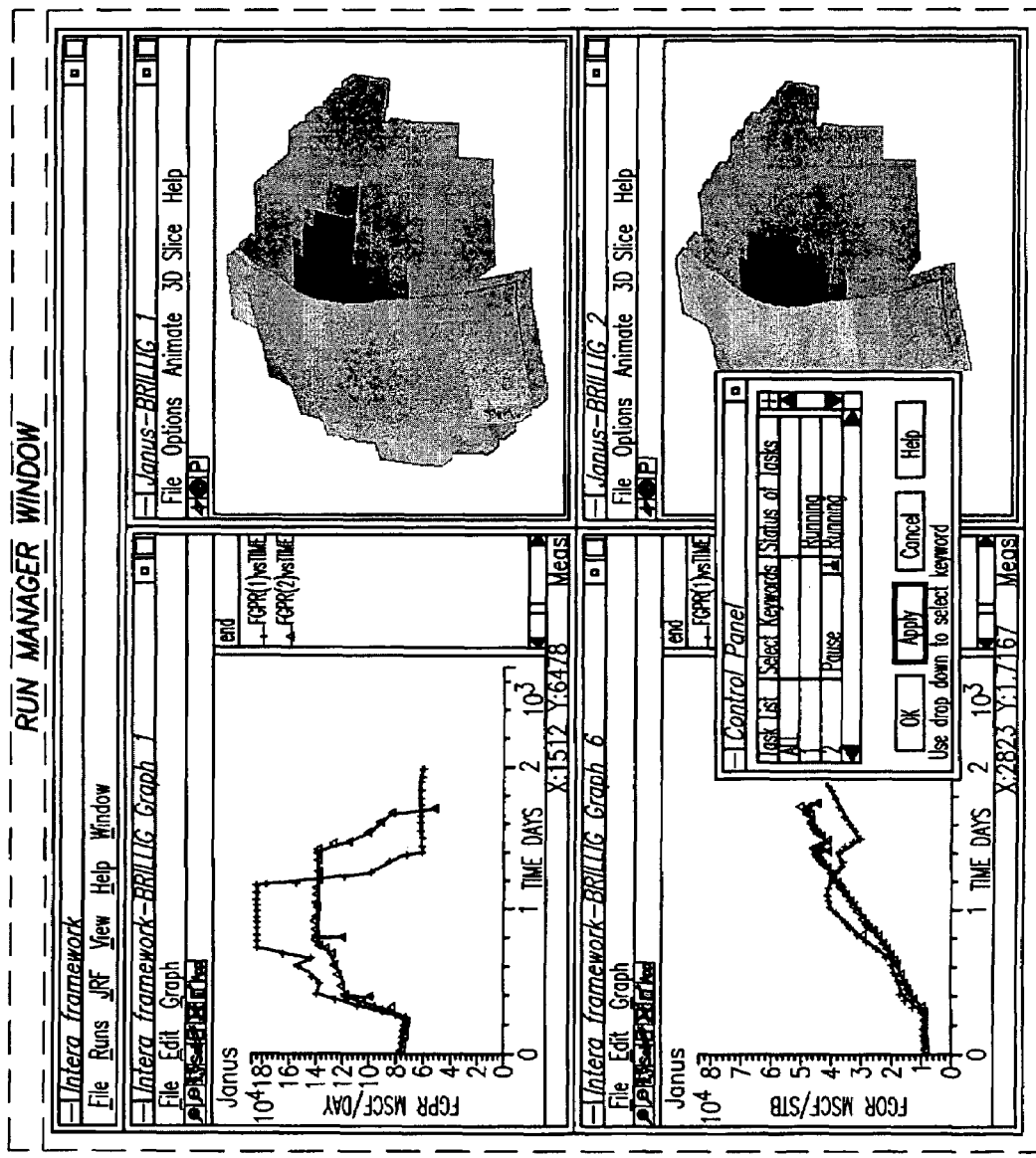
FIG. 29 illustrates a window display generated by the run manager.

Refer now to FIG. 29 which illustrates the Run Manager 46c3 window. FIG. 29 illustrates a view of "Janus", which forms the basis of the Run Manager. The Run Manager 46c3 window of FIG. 29 consists of a menu bar and icons.

Results Viewer 1A of FIG. 13

Refer now to FIG. 30 for the workflow or functional block diagram of the Results viewer 1A of FIG. 13. The functional block diagram of the results viewer 1A of FIG. 30 is duplicated below, as follows:

1. Run Manager (monitor and control)—block 166
2. Results viewer (real time updates)—high quality hardcopy—block 168
    a) Vector data—block 170
        i) predefined layouts for main plots
            a) ability to plot anything against anything including observed data (RFT, PLT)
    b) Solution data—block 172
        i) 2D areal—2D cross section
            a) well locations/tracks
                1) contours and cell based color displays
                    a) ability for derived quantities
        ii) optional 3D display
    c) Run controller (as Janus)—block 174
        i) STOP, PAUSE
        ii) Advance and write RESTART The results viewer 1A window (screen display) consists of a Menu Bar, Post Processor pushbuttons, Icons, and a display of the current model (case/scenario) representing the model area together with the wells. This will be blank if a no case/scenario is selected.

Report Generator 1B of FIG. 13

Figure 31:
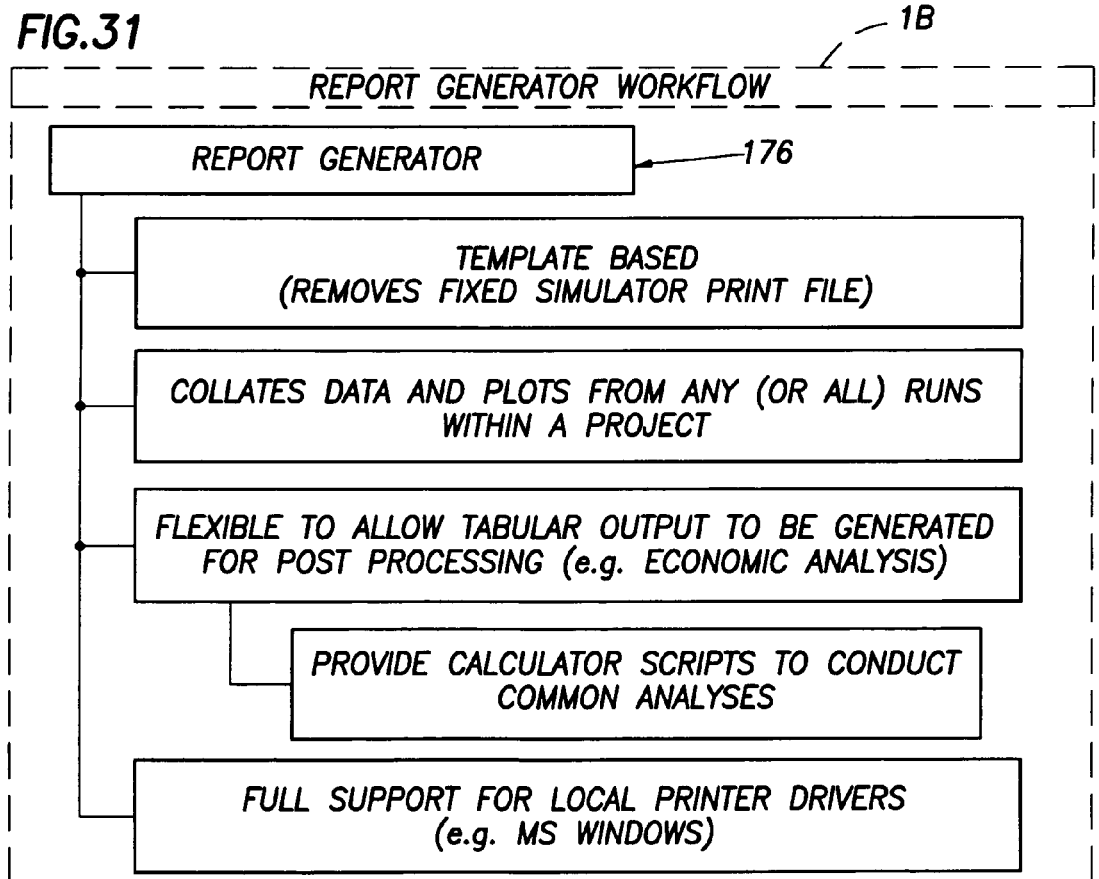
FIG. 31 illustrates a workflow or functional block diagram of the report generator of FIG. 13.

Refer now to FIG. 31 for the workflow or functional block diagram of the Report Generator 1B of FIG. 13. The functional block diagram of the report generator 1B of FIG. 13, as shown in FIG. 31, is duplicated below, as follows:

Report Generator—block 176
1. Template based (removes fixed simulator print file)
2. Collates data AND plots from any (or all) runs within a project
3. Flexible to allow tabular output to be generated for post processing (e.g. economic analysis)
    a) provide calculator scripts to conduct common analyses
4. Full support for 'local' printer drivers (e.g. MS windows)
Layout The report generator 1B window (screen display) consists of a Menu Bar, Icons, and a display of the current model (case/scenario) representing the model area together with the wells. This will be blank if a no case/scenario is selected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A computer implemented method of generating a plurality of simulation results for an oilfield reservoir, comprising:

obtaining a plurality of cases and a plurality of scenarios comprising a plurality of grid geometry parameters describing the oilfield reservoir;

forming, using a computer, a plurality of simulator input files, each of the plurality of simulator input files comprising one of the plurality of cases and one of the plurality of scenarios wherein the plurality of simulator input files is stored in memory of the computer;

generating, using the computer, a tree comprising a first case as a root node of the tree, a first scenario as a first child node of the root node, a second case as a second child node of the root node, and a second scenario as a child node of the second child node, wherein the grid geometry parameters of the first case and the second case are different, wherein the grid geometry parameters of the first case and the first scenario are identical, and wherein the grid geometry parameters of the second case and the second scenario are identical;

storing the tree in the memory of the computer;

selecting, using the computer, a subset of the plurality of simulator input files from the tree, wherein the plurality of scenarios includes the first scenario and the second scenario, and wherein the plurality of cases includes the first case and the second case;

submitting the selected subset of the plurality of simulator input files to a simulator executing on the computer, wherein the simulator executes a simulation of the oilfield reservoir based on the selected subset of the plurality of simulator input files to generate the plurality simulation results for the oilfield reservoir;

obtaining the plurality of simulation results; and displaying the plurality of simulation results on a display device of the computer.

2. The method of claim 1, wherein the plurality of scenarios further comprises a plurality of permeability parameters, a plurality of pressure parameters, and a plurality of temperature parameters describing the oilfield reservoir.

3. The method of claim 1, wherein the first case further comprises a radial model type.

4. The method of claim 1, further comprising:
obtaining a first plurality of keywords from the selected subset of the plurality of simulator input files;
generating a second plurality of keywords by editing the first plurality of keywords; and
submitting the second plurality of keywords to the simulator, wherein the simulation of the oilfield reservoir is further based on the second plurality of keywords.

5. The method of claim 1, further comprising:
storing the plurality of simulation results in a results file.

6. The method of claim 1, further comprising:
generating a report documenting the plurality of simulation results.

7. A computer readable medium storing computer executable instructions which when executed on a computer perform a method of generating a plurality of simulation results for an oilfield reservoir, the medium comprising instructions to:

obtain a plurality of cases and a plurality of scenarios comprising a plurality of grid geometry parameters describing the oilfield reservoir;

form a plurality of simulator input files, each of the plurality of simulator input files comprising one of the plurality of cases and one of the plurality of scenarios wherein the plurality of simulator input files is stored in memory of a computer;

generate a tree comprising a first case as a root node of the tree, a first scenario as a first child node of the root node, a second case as a second child node of the root node, and a second scenario as a child node of the second child node, wherein the grid geometry parameters of the first case and the second case are different, wherein the grid geometry parameters of the first case and the first scenario are identical, and wherein the grid geometry parameters of the second case and the second scenario are identical;

select a subset of the plurality of simulator input files from the tree;

submit the selected subset of the plurality of simulator input files to a simulator, wherein the simulator executes a simulation of the oilfield reservoir based on the selected subset of the plurality of simulator input files to generate the plurality of simulation results for the oilfield reservoir;

obtain the plurality of simulation results; and display the plurality of simulation results on a display device of the computer.

8. The computer readable medium of claim 7, wherein the plurality of scenarios further comprises a plurality of permeability parameters, a plurality of pressure parameters, and a plurality of temperature parameters describing the oilfield reservoir.

9. The computer readable medium of claim 7, wherein the first case further comprises a radial model type.

10. The computer readable medium of claim 7, the medium further comprising instructions to:
obtain a first plurality of keywords from the selected subset of the plurality of simulator input files;
generate a second plurality of keywords by editing the first plurality of keywords; and
submit the second plurality of keywords to the simulator, wherein the simulation of the oilfield reservoir is further based on the second plurality of keywords.

11. The computer readable medium of claim 7, the medium further comprising instructions to:
store the plurality of simulation results in a results file.

12. The computer readable medium of claim 7, the medium further comprising instructions to:
generate a report documenting the plurality of simulation results.

13. A computer system comprising:
a processor;
a memory operatively connected to the processor; and
a plurality of instructions stored in the memory comprising functionality to:
obtain a plurality of cases and a plurality of scenarios comprising a plurality of grid geometry parameters describing the oilfield reservoir;
form a plurality of simulator input files, each of the plurality of simulator input files comprising one of the plurality of cases and one of the plurality of scenarios wherein the plurality of simulator input files is stored in the memory;
generate a tree comprising a first case as a root node of the tree, a first scenario as a first child node of the root node, a second case as a second child node of the root node, and a second scenario as a child node of the second child node, wherein the grid geometry parameters of the first case and the second case are different, wherein the grid geometry parameters of the first case and the first scenario are identical, and wherein the grid geometry parameters of the second case and the second scenario are identical;
select a subset of the plurality of simulator input files from the tree;
submit the selected subset of the plurality of simulator input files to a simulator, wherein the simulator executes a simulation of the oilfield reservoir based on the selected subset of the plurality of simulator input files to generate the plurality of simulation results for the oilfield reservoir;
obtain the plurality of simulation results; and
display the plurality of simulation results on a display device.

14. The computer system of claim 13, wherein the plurality of scenarios further comprises a plurality of permeability parameters, a plurality of pressure parameters, and a plurality of temperature parameters describing the oilfield reservoir.

15. The computer system of claim 13, wherein the first case further comprises a radial model type.

16. The computer system of claim 13, the instructions further comprising functionality to:
   obtain a first plurality of keywords from the selected subset of the plurality of simulator input files;
   generate a second plurality of keywords by editing the first plurality of keywords; and
   submit the second plurality of keywords to the simulator, wherein the simulation of the oilfield reservoir is further based on the second plurality of keywords.

17. The computer system of claim 13, the instructions further comprising functionality to:
   store the plurality of simulation results in a results file.

18. The computer system of claim 13, the instructions further comprising functionality to:
   generate a report documenting the plurality of simulation results.

* * * * *